US010545784B2

(12) United States Patent
Strasky et al.

(10) Patent No.: US 10,545,784 B2
(45) Date of Patent: Jan. 28, 2020

(54) VIRTUAL AUTOCALIBRATION OF SENSORS

(71) Applicant: USNR, LLC, Woodland, WA (US)

(72) Inventors: Douglas G. Strasky, Parksville (CA); Erik W. Kalf, Errington (CA); Brian Walts, Nanaimo (CA)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 16/182,569

(22) Filed: Nov. 6, 2018

(65) Prior Publication Data

US 2019/0138340 A1    May 9, 2019

Related U.S. Application Data

(60) Provisional application No. 62/582,305, filed on Nov. 6, 2017.

(51) Int. Cl.
*G06F 9/455* (2018.01)

(52) U.S. Cl.
CPC .......... *G06F 9/45558* (2013.01); *G06F 2009/45583* (2013.01); *G06F 2009/45591* (2013.01)

(58) Field of Classification Search
CPC ....... B23D 59/008; B27B 1/007; B27B 25/00; B27B 31/00; B27B 31/06; B27M 1/08; G01B 11/245; G05B 19/4097; G05B 2219/42155; G06F 2009/45583; G06F 2009/45591; G06F 9/44505; G06F 9/455; G06F 9/45558
USPC ..... 702/85, 91, 93, 94, 104; 356/243.1, 602, 356/625, 638; 144/357
See application file for complete search history.

(56) References Cited

U.S. PATENT DOCUMENTS

| | | |
|---|---|---|
| 2008/0184856 A1 | 8/2008 | Koskovich |
| 2009/0030293 A1 | 1/2009 | Cooper |
| 2009/0067749 A1 | 3/2009 | Schiewe |
| 2009/0299688 A1 | 12/2009 | Kohler |
| 2016/0003111 A1 | 2/2016 | Middleton |
| 2016/0031110 A1 | 2/2016 | Middleton |
| 2018/0311860 A1* | 11/2018 | Strasky .................. B27B 1/007 |

OTHER PUBLICATIONS

Canadian Patent Application No. 3,023,405; Examiner's Report; dated Aug. 8, 2019.
International Patent Application No. PCT/US2018/059508; International Search Report and Written Opinion; dated Mar. 15, 2019.

* cited by examiner

*Primary Examiner* — John H Le
(74) *Attorney, Agent, or Firm* — Schwabe Williamson & Wyatt, P.C.

(57) ABSTRACT

The present disclosure describes methods and systems for virtually calibrating geometric sensors with overlapping fields of view. In some embodiments, a geometric sensor may be virtually calibrated by applying a correction value to profile data obtained by the geometric sensor to generate adjusted profile data. The correction factor may be determined based at least in part on X-Y offsets and/or rotational offsets of prior profile data obtained by the geometric sensor relative to corresponding profile data obtained by a reference geometric sensor, and may be recalculated or updated as new sets of profile data are obtained. The adjusted profile data may be used in place of the original profile data in various data processing operations to functionally offset a positional error of the geometric sensor.

20 Claims, 15 Drawing Sheets

US 10,545,784 B2

VIRTUAL AUTOCALIBRATION OF SENSORS

CROSS REFERENCE TO RELATED APPLICATIONS

This application claims priority to U.S. Provisional Patent Application No. 62/582,305, filed on Nov. 6, 2017, entitled "VIRTUAL AUTOCALIBRATION OF SENSORS," the disclosure of which is incorporated herein.

BACKGROUND

Large sawmills typically cut logs into lumber in stages. In the first stage, or primary breakdown, the logs are rotated to a desired angle and conveyed through chippers and/or saws that cut the logs into cants. Some mills cut flitches from the cants by cutting the cants longitudinally along planes generally parallel to the machined faces. Other mills profile side boards along the machined faces of the cants, and the cants are then cut longitudinally to release the side boards. In both cases, the log is cut into a center cant and one or more additional pieces (or chipped into a center cant and chips) during this stage.

In the second stage, or secondary breakdown, the center cant is cut into center boards by a gang saw, any flitches are cut into outer boards by an edger, and all of the boards are trimmed to desired lengths.

In many sawmills, some or all of the machine centers are controlled automatically by a control system based on workpiece position, orientation, dimensions, and other information obtained by scanners. The workpiece is conveyed through a scan zone upstream of the machine center, and the computer system uses the profile data to position and/or cut the workpiece into the desired pieces.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
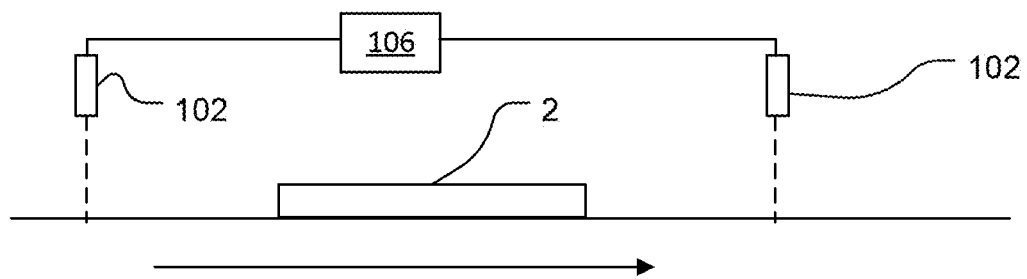
FIGS. 1A and 1B show schematic diagrams of multi-zone and single-zone virtual calibration systems, respectively.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As used herein, the term "sensor" refers generally to a device configured to detect one or more physical characteristics of an object, such as a log, flitch, cant, board, or other type of wood workpiece. Examples of sensors include, but are not limited to, imaging devices (e.g., line scan cameras, video cameras, fiber optic sensors, laser profile sensors, x-ray/tomography sensors, microwave sensors, ultrasound sensors, infrared sensors, etc.), and devices configured to detect temperature, vibration, fluorescence, speed, density, moisture, and/or other characteristic(s) of the object.

The term "geometric sensor" refers more specifically to a device configured to measure the geometric profile of an object or portion thereof. Examples of geometric sensors include, but are not limited to, time-of-flight 3D sensors, laser triangulation sensors, structured-light 3D sensors, modulated light 3D sensors, and computed tomography sensors.

As used herein, the term "scanner" refers to the geometric sensor(s) (and to the additional sensor(s), if any) positioned to detect workpieces within a given scan zone. Some scanners may include only one geometric sensor, which may be positioned above, below, or to one side of the flow path. Other scanners may include two or more geometric sensors arranged around, above, below, across, along, and/or on opposite sides of the flow path, or in any other suitable manner. Some scanners may include one or more other types of sensors in addition to geometric sensors. In some cases, a scanner may include two or more geometric sensors, or groups of geometric sensors, that are positioned to detect workpieces within respective sub-zones of the scan zone. Again, the geometric sensor(s) of each sub-zone may be arranged above, below, beside, around, across, and/or along the flow path, in any suitable manner.

In various embodiments, a computing device may be endowed with one or more components of the disclosed apparatuses and/or systems and may be employed to perform one or more methods as disclosed herein.

A typical processing line has machine centers arranged along a path of flow and transports (conveyors, transfers, etc.) that move objects such as wood workpieces through the machine centers along the path of flow. For example, a facility that produces solid lumber may have intake, primary breakdown, secondary breakdown, planer/dry mill, and/or other processing lines. Scanners are used frequently in sawmills and other production facilities to obtain information about the position, dimensions, and other attributes of a workpiece upstream of a machine center that will be used to process the workpiece.

For example, in some sawmills a log is conveyed through multiple scan zones upstream of a chipper. A computer system uses the profile data to determine a desired rotational angle and orientation (e.g., horizontal and vertical offset and skew) for the log, as well as a cut solution for cutting the log into desired products (e.g., center boards and side boards or outer boards). The log is turned, positioned, and chipped according to the cut solution and some or all of the resulting pieces are cut again, eventually yielding the desired cut products. The log may travel through several scan zones before, during, and/or after the chipping and cutting procedures, and the profile data collected in the scan zones may be used to control corresponding machine centers.

In some cases, profile data from two scanners or geometric sensors must be matched to one another. For example, a log may be conveyed through a first scan zone upstream of a log turner, and the corresponding profile data may be used to determine a desired rotational position for the log about its longitudinal (Z) axis, and/or a desired lateral offset or skew angle, relative to the log's initial rotational position. A computer system might need to match the profile data to profile data collected in a second scan zone at the log turner in order to monitor the rotation of the log and control the log turner to turn the log accurately to the desired position before the log is thumped onto a sharp chain for chipping or cutting. Likewise, the computer system may need to match the profile data from the second scan zone to profile data from a third scan zone further downstream along the sharp chain to determine the final position of the log on the sharp chain and/or calculate or modify a cut solution or cut pattern for the log to offset a difference between the desired position and the final position.

In other cases, processing a workpiece accurately may require matching the profile data from two sensors of the same scan zone. For example, a scanner with multiple geometric sensors might be used to scan flitches upstream of an edger, and the profile data might be used to calculate a cut solution for the flitches without reference to the original cut solutions for the logs. In such cases the computer system might need to match or align the data from the adjacent geometric sensors to generate a virtual model of the workpiece, identify defects, calculate or modify a cut solution/pattern, assess the position or orientation of the workpiece relative to a machine center, and/or generate control instructions to control a machine center to cut the workpiece correctly. In addition to matching profile data from geometric sensors of one scan zone, the profile data from those geometric sensors may also be matched to profile data from another scanner or geometric sensors thereof.

Maintaining scanners and geometric sensors in precise alignment aids in the matching process. If a scanner/geometric sensor is misaligned, the computer system may require more time to match the data, resulting in reduced line speeds. A misaligned sensor may also increase the likelihood of an incorrect match. If the computer system matches the profile data incorrectly, the computer system may generate control instructions that cause the workpiece to be positioned or cut incorrectly, resulting in waste and loss of profit.

The conventional way to maintain proper scanner/sensor alignment is to manually calibrate each sensor. Conventional calibration methods require manual measurement and adjustment of the position of each scanner/sensor relative to a fixed reference position, or relative to a temporary calibration target placed at a known location. Performing these measurements and adjustments with the necessary accuracy can be challenging, labor-intensive, and time-consuming. The operator may be required to reduce the operating speed of nearby equipment, or to stop the entire processing line, while the sensors are being calibrated. The associated downtime is costly and undesirable. Moreover, vibration of the equipment during normal operation and/or sudden impacts such as thumping the log down onto the sharp chain may necessitate frequent recalibration of the sensors, increasing downtime and further impacting profits.

Embodiments of methods for automatic virtual calibration of geometric sensors, and corresponding virtual calibration systems, are described herein. Such calibration techniques are described herein as 'virtual' in the sense that the calibration is functional, performed by adjusting data as opposed to physically moving the geometric sensor. In various embodiments, a first geometric sensor may be functionally calibrated by determining a correction factor for that geometric sensor, based at least on an X-Y offset of profile data from that geometric sensor relative to reference profile data from another geometric sensor, and applying the correction factor to a subsequent set of profile data from the first geometric sensor to thereby generate an adjusted set of profile data. Optionally, the correction factor may be an average of, or otherwise derived from, the X-Y offsets of multiple sets of profile data relative to the corresponding reference sets of profile data.

Adjustments to profile data (e.g., adjustments to the transformation function(s) applied to the data)—as opposed to adjustments to the physical position or orientation of scanners—may be made 'on the fly,' while workpieces are being conveyed and cut. Moreover, such adjustments may be done continuously or at frequent intervals to keep a scanner 'virtually' calibrated despite exposure to vibration, impacts, and other such events. This may allow the processing line to continue operation as the geometric sensors become misaligned, allowing the operator to delay manual recalibration for longer periods of time and helping to reduce the number of unplanned stoppages. Virtual calibration may improve the performance of computers and computer systems by making the profile data easier to match, thereby reducing the computational demands on the processor. Thus, embodiments of the present disclosure may help to reduce downtime associated with prior calibration methods, reduce the frequency with which the operator must adjust the physical position(s) of the scanner(s), help to maintain or improve the accuracy with which the workpieces are cut by the machine centers, and/or improve the performance of computers and computer systems used to match sets of profile data.

In various embodiments, a virtual calibration system may include at least a first geometric sensor, a second geometric sensor, and a computer system operatively coupled with the first and second geometric sensors.

In a multi-zone virtual calibration system, the first geometric sensor and the second geometric sensor may be positioned to scan objects (e.g., pieces of wood) in corresponding first and second scan zones that are spaced apart along a path of flow.

In a single-zone virtual calibration system, the first and second geometric sensors may be positioned to scan objects (e.g., pieces of wood) within a single scan zone.

Regardless, the computer system may virtually calibrate the first geometric sensor relative to the second geometric sensor, or vice versa, or both, based at least in part on overlapping profile data (i.e., profile data collected by multiple geometric sensors for the same portion of an object). In some embodiments, a virtual calibration system may function as both a single-zone and multi-zone system. For example, a first group of geometric sensors and a second group of geometric sensors may be positioned to scan objects in first and second scan zones, respectively, and the computer system may virtually calibrate the geometric sensors of each group relative to one another and virtually calibrate one group relative to the other group.

Figure 1B:
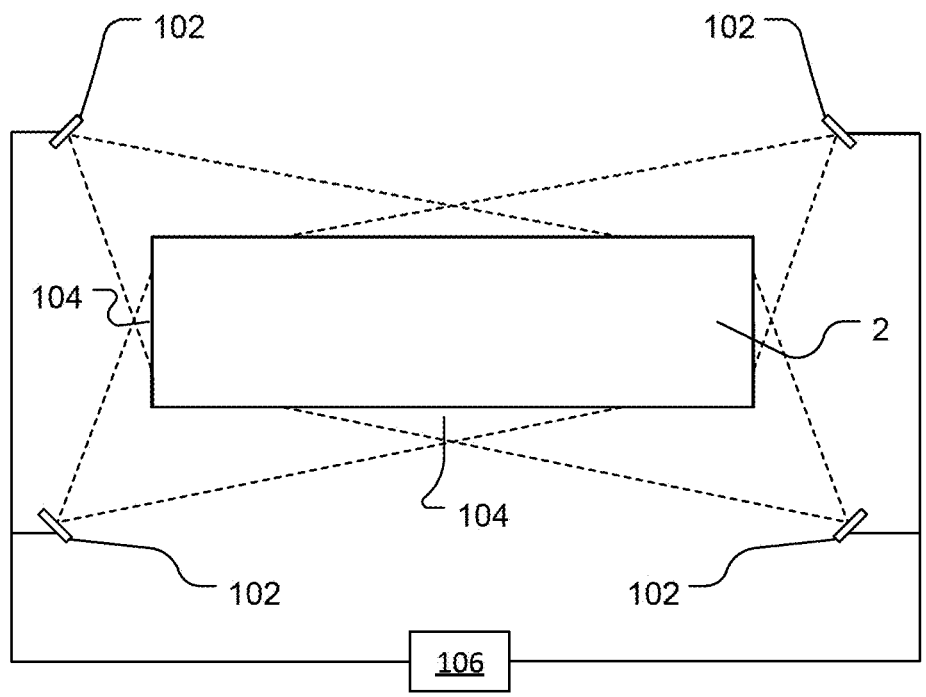

Turning now to the Figures, a schematic side elevational view of a multi-zone calibration system is shown in FIG. 1A and a schematic front elevational view of a single-zone virtual calibration system is shown in FIG. 1B, all in accordance with various embodiments.

Referring first to FIG. 1A, in a multi-zone calibration system, at least two scanners—each with at least one geometric sensor 102—may be arranged along a flow path to scan an object 2 at corresponding scan zones (dashed lines) as the object is moved along the flow path in a flow direction (arrow) through the scan zones of the scanners. The geometric sensors 102 are positioned/oriented to scan at least a portion of the object (e.g., an uppermost surface) at different locations, such that they obtain overlapping profile data. Therefore, although the fields of view of the geometric sensors 102 may be spaced apart along the flow path, the geometric sensors 102 are positioned to scan the same portion of the object and are thus considered to have overlapping fields of view. In some embodiments, each scanner/scan zone may have multiple geometric sensors 102 arranged around, above and below, and/or along opposite sides of the flow path or in any other suitable manner. Regardless, the geometric sensors 102 may be operatively coupled with a computer system 106. Computer system 106 may be configured to virtually calibrate one of the scanners/geometric sensors 102 relative to the other scanner/geometric sensor(s) 102, as described further below.

A single-zone virtual calibration system, as shown for example in FIG. 1B, may include a scanner that has at least two geometric sensors 102 arranged around, above and below, and/or along opposite sides of the flow path to scan an object 2 passing through the scan zone of the scanner. Some or all of the geometric sensors 102 may have overlapping fields of view (dashed lines). In some embodiments, the fields of view may overlap along a plane, such that the geometric sensors 102 scan the same portion of the workpiece (e.g., the portion within the overlap zone 104) simultaneously. In other embodiments the scan zone may have multiple sub-zones, and the fields of view of the corresponding geometric sensors 102 may be spaced apart along the flow path such that the portion of the object within the overlap zone 104 is scanned sequentially by the respective geometric sensors. In either case, the profile data collected by the geometric sensors 102 may include overlapping profile data. The geometric sensors 102 may be operatively coupled with a computer system 106. Again, computer system 106 may be configured to virtually calibrate one of the geometric sensors 102 relative one or more of the other geometric sensors 102, as described further below.

Some virtual calibration systems may include multiple scanners spaced apart along the flow path (e.g., as shown in FIG. 1A), each with multiple geometric sensors 102 (e.g., as shown in FIG. 1B), and a computer system (e.g., computer system 106) operatively coupled with the scanners/geometric sensors. The computer system may be configured to virtually calibrate at least one of the scanners relative to another of the scanners, and to virtually calibrate at least one of the geometric sensors of a scanner relative to another geometric sensor of that scanner.

Geometric sensors 102 may be any geometric sensors suitable for measuring the 3D profile of an object, such as a piece of wood, by determining the distances between a reference location (e.g., the geometric sensor) and a plurality of points along the outer surface of the object. In particular, geometric sensors 102 may be any geometric sensors suitable for measuring the 3D profile of a wood workpiece, such as a stem, a log, a cant, a flitch, a slab, a board, or the like. In various embodiments, geometric sensors 102 may be laser profile sensors. Preferably, geometric sensors 102 are configured to obtain surface measurement data (e.g., distance values), filter the obtained data, and convert the filtered data to dimension (X-Y) coordinates ("data points"). Examples of suitable geometric sensors include, but are not limited to, USNR Smart TriCam sensors with integral DSP processor frame grabber (e.g., for scanning flitches in a transverse orientation) and USNR LPL or LPLe sensors (e.g., for scanning flitches in a lineal orientation).

Some scanners may include geometric sensors arranged across the direction of flow, over and/or under the flow path, to scan objects moving in a transverse orientation (with the long axis of the object transverse to the flow direction). Other scanners may include geometric sensors arranged around, above and below, and/or on opposite sides of, the flow path to scan objects moving in a lineal orientation (with the long axis of the object generally parallel to the flow direction). Optionally, some or all of the geometric sensors of a scanner may be positioned at angles to scan two corresponding surfaces of a workpiece with cut faces/sides.

Examples of scanners with multiple geometric sensors 102 are shown in FIGS. 2A-3C, in accordance with various embodiments. Optionally, some scanners may include one or more other types of sensors 132 (e.g., color vision cameras, grain angle sensors, x-ray sensors, ultrasound sensors) in addition to the geometric sensor(s) 102.

Figure 2A:
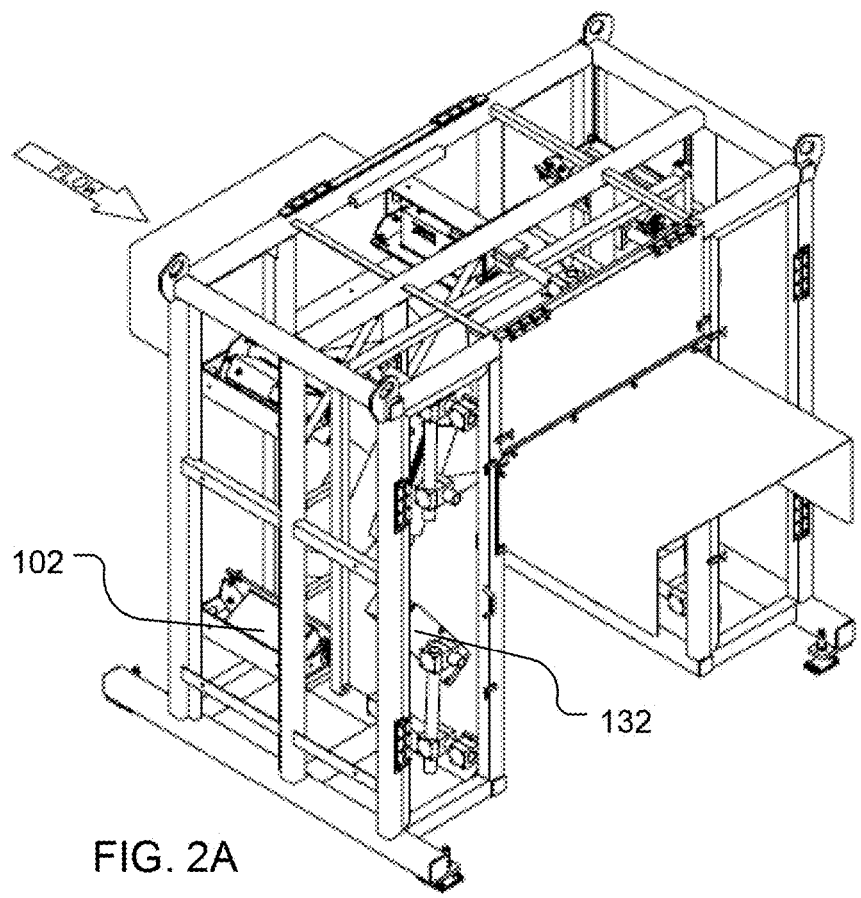
FIG. 2A-2E illustrate examples of lineal scanners with geometric sensors arranged in various configurations.
Figure 2B:
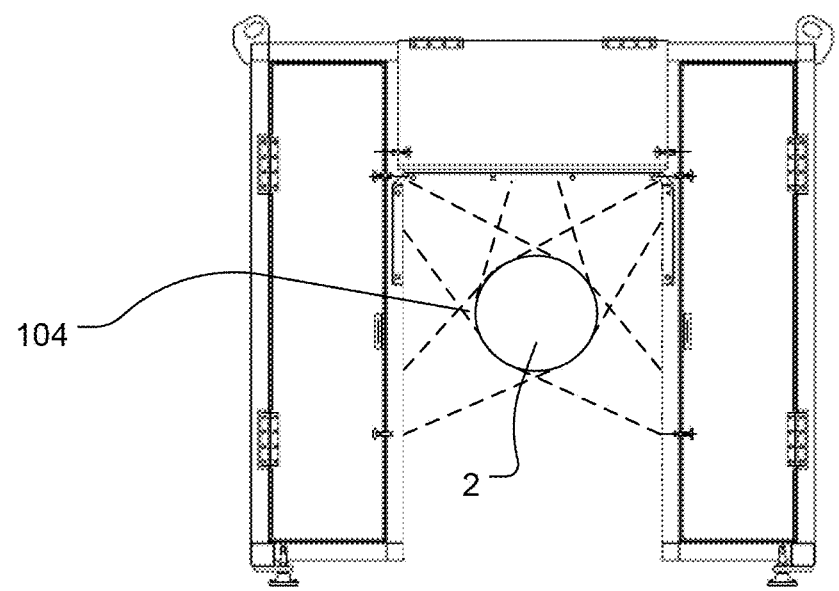
Figure 2C:
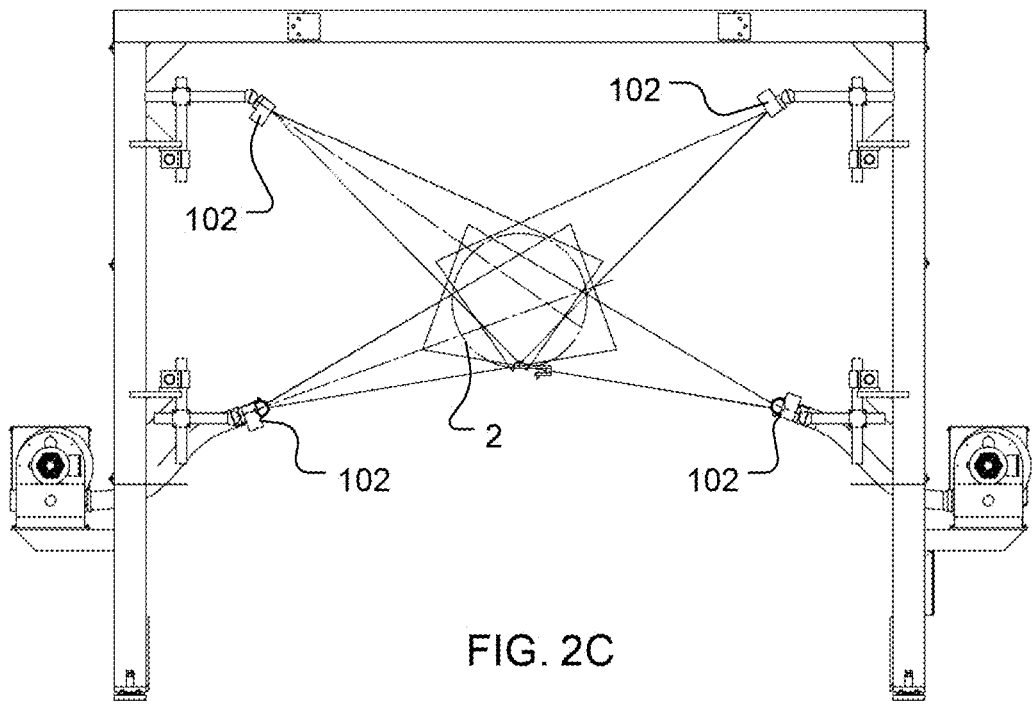
Figure 2D:
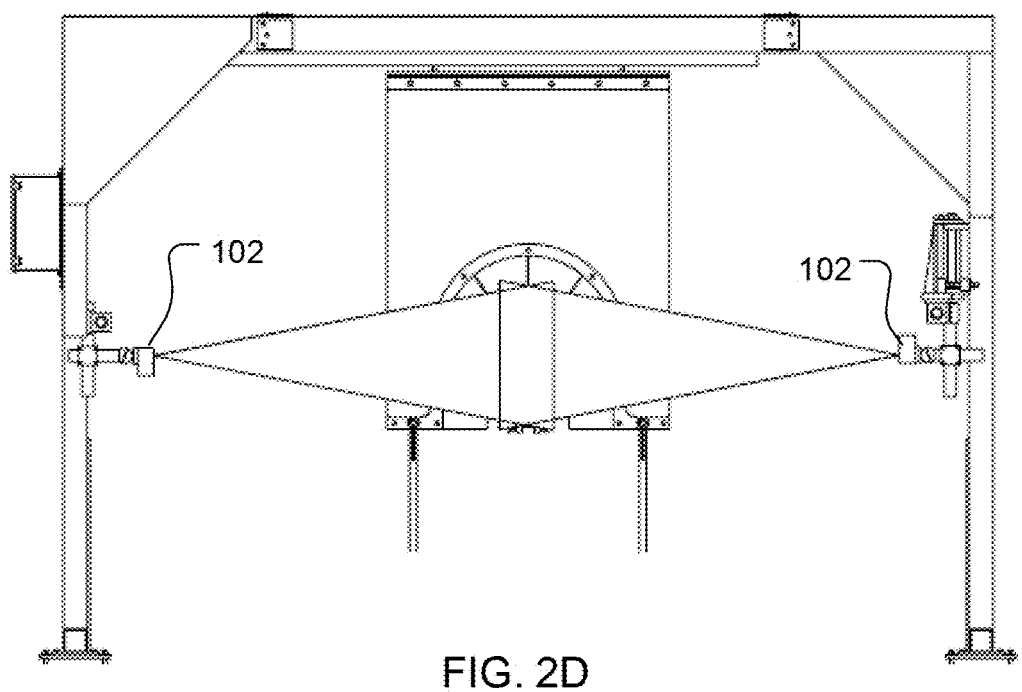
Figure 2E:
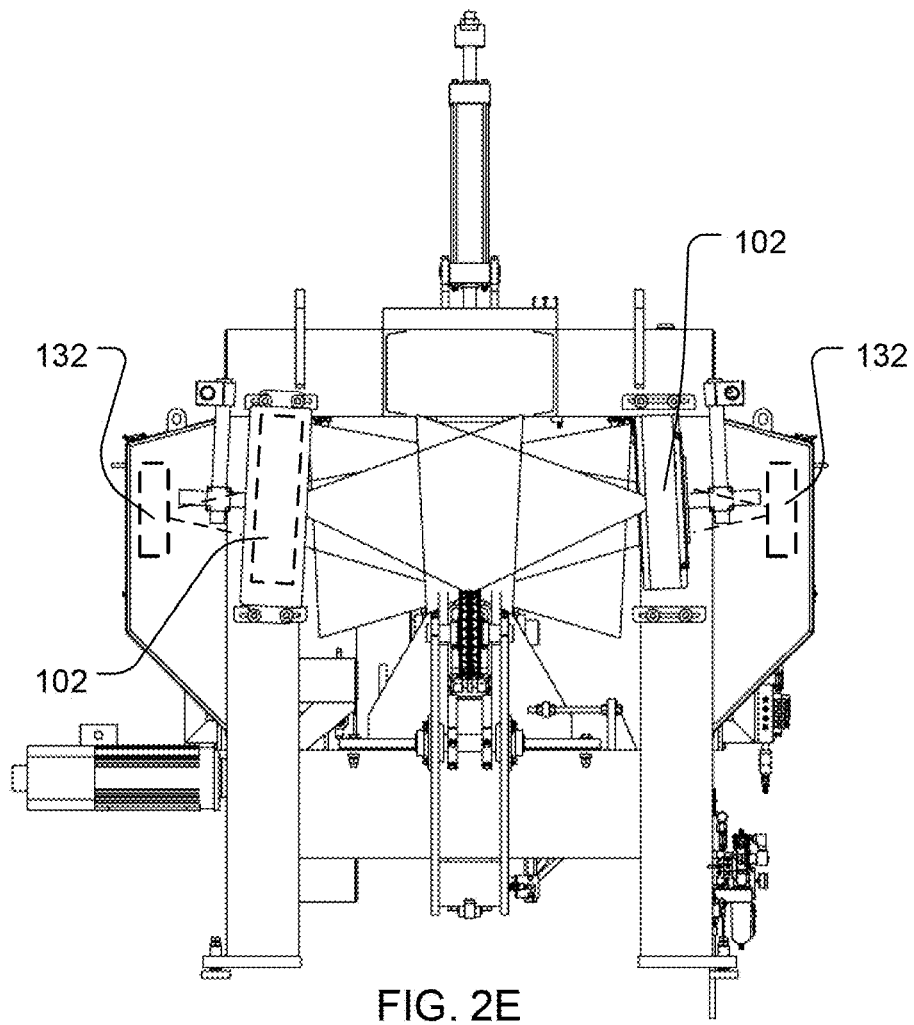
Figure 3A:
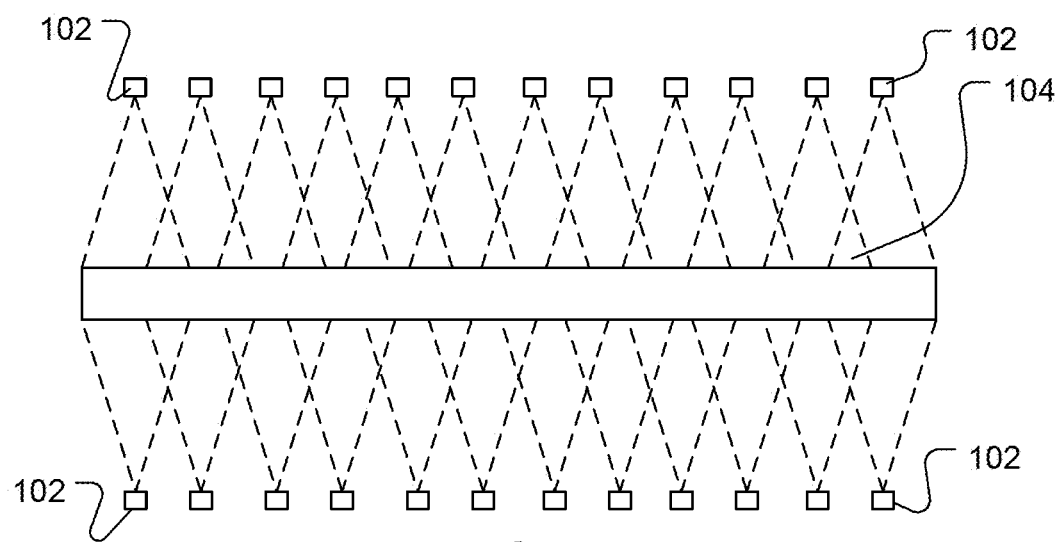
FIGS. 3A-3C illustrate examples of transverse scanners.
Figure 3B:
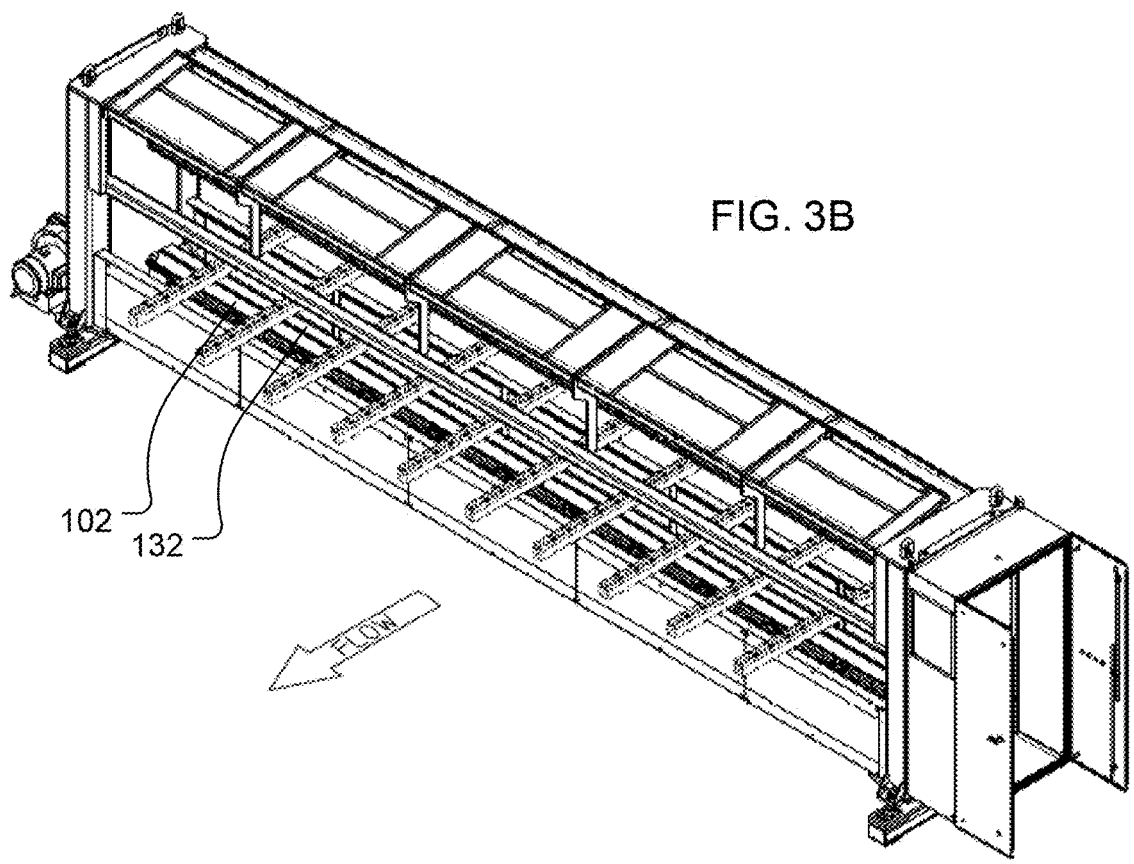
Figure 3C:
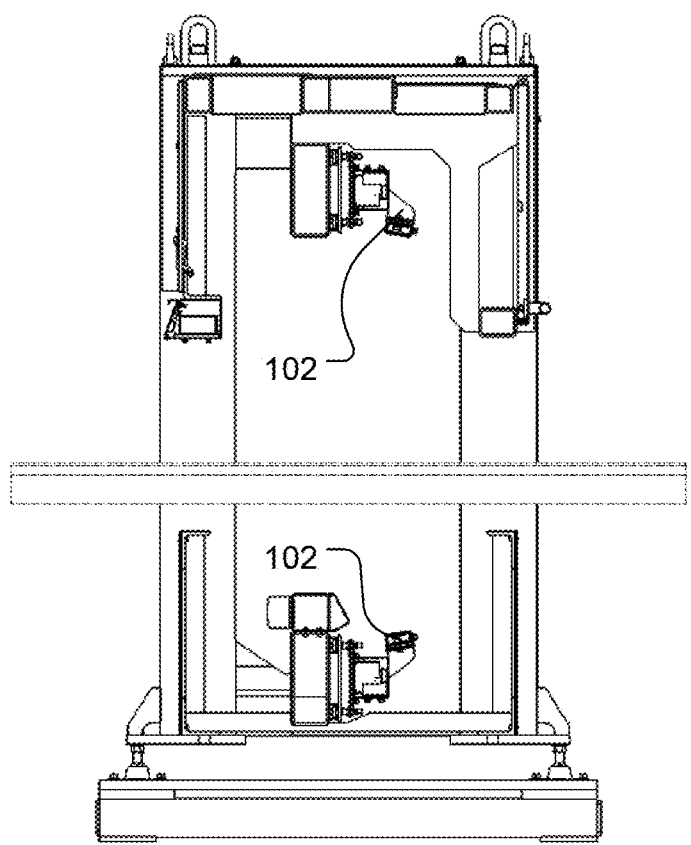

FIGS. 2A and 2B show perspective and front elevational views, respectively, of a scanner with five geometric sensors 102 arranged around the flow path, with the respective fields of view of adjacent geometric sensors overlapping at overlap regions 104. FIGS. 2C-2E show front elevational views of scanners with four geometric sensors 102 (FIG. 2C) and two geometric sensors 102 (FIGS. 2D, 2E). FIG. 3A shows a schematic front elevational view of a transverse scanner, and FIGS. 3B and 3C show perspective and side elevational views, respectively, of a transverse scanner, all with multiple geometric sensors 102. These configurations are illustrated merely by way of example, and the number and arrangement of scanners and geometric sensors will vary among embodiments.

Referring again to FIGS. 1A and 1B, computer system 106 may include one or more computers. In some embodiments, computer system 106 may further include one or more controllers (e.g., programmable logic controllers and/or motion controllers), position indicator devices, servers, and/or output devices, in any suitable number, type, and configuration.

In operation, as an object is moved along the flow path (e.g., on a conveyor) through the fields of view of the geometric sensors 102, the object may be scanned by the geometric sensors 102. The profile data from one scanner/geometric sensor may be matched to corresponding profile data from another scanner/geometric sensor for various processing tasks, such as identifying changes in the position or orientation of the object or controlling a piece of equipment to reposition or cut the object correctly. If one of the geometric sensors 102 is misaligned relative to the other, the profile data from the misaligned geometric sensor may be offset (e.g., rotationally and/or along the X and/or Y axes) relative to the profile data from the other geometric sensor.

Figure 4:
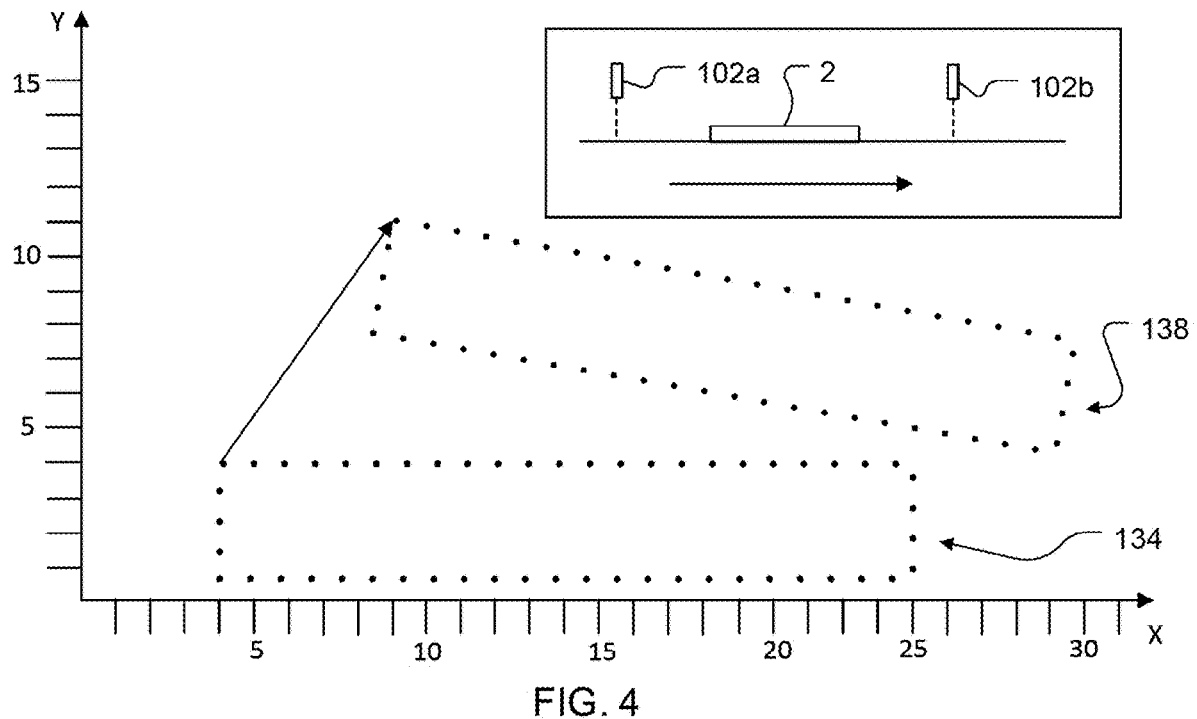
FIG. 4 shows a schematic diagram of profile data and a corresponding multi-zone scanner arrangement.
Figure 5:
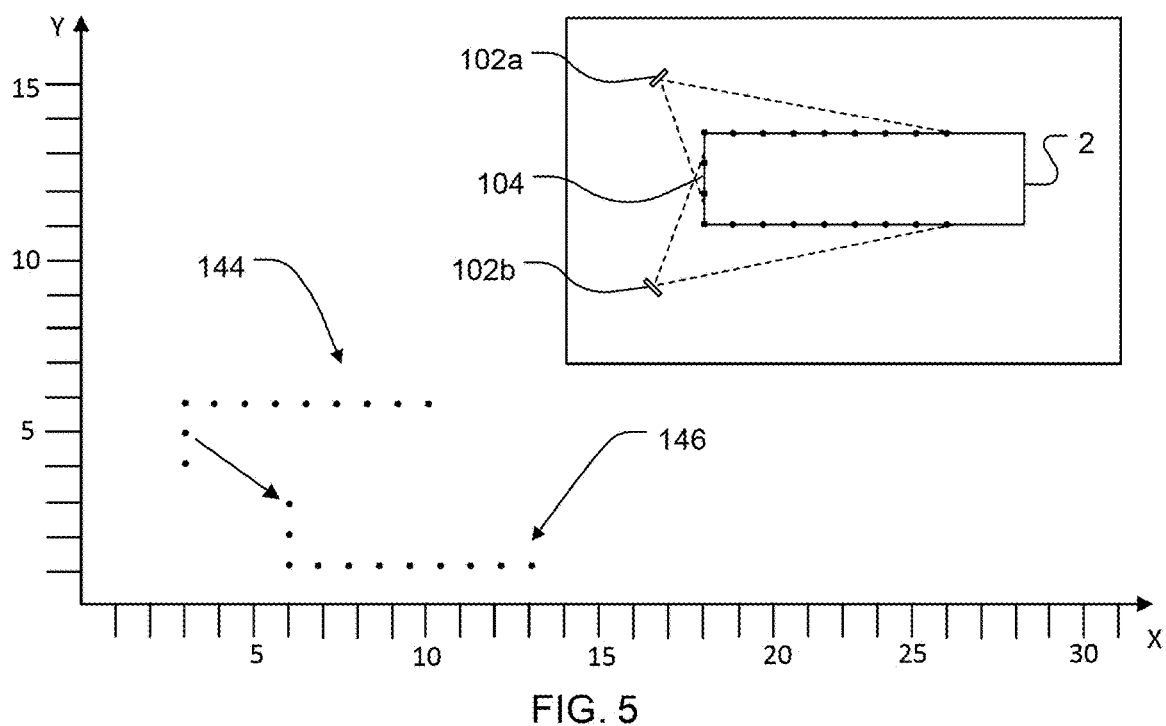
FIG. 5 shows a schematic diagram of profile data and a corresponding single-zone scanner arrangement.

FIGS. 4 and 5 are schematic illustrations of sets of profile data obtained by respective geometric sensors, in accordance with various embodiments. Because the geometric sensors have overlapping fields of view (see insets), the sets of profile data include overlapping data points (arrows). The inset of FIG. 4 shows a schematic side elevational view of a geometric sensor 102a and a geometric sensor 102b positioned to scan an object 2 in corresponding scan zones spaced apart along a flow path. In this example geometric sensor 102b is misaligned relative to geometric sensor 102a. As a result, the set of profile data 138 collected by geometric sensor 102b is rotated by −10 degrees and offset by 4.5 units along the X axis and 7 units along the Y axis relative to the reference set of profile data 134 collected by geometric sensor 102a. The inset of FIG. 5 shows a schematic front elevational view of a geometric sensor 102a and a geometric sensor 102b positioned to scan an object 2 within a single scan zone, with the respective fields of view overlapping at an overlap zone 104. In this illustration, geometric sensor 102b is misaligned relative to geometric sensor 102a. As a result, the set of profile data 146 from geometric sensor 102b is offset by 0 degrees of rotation, 3 units along the X axis, and −2 units along the Y axis relative to the reference set of profile data 144 from the geometric sensor 102a. The units may be inches, centimeters, or any other suitable unit of measure.

Such misalignments can be detrimental to the matching process. Thus, in various embodiments, the computer system may be configured to perform a virtual calibration method to functionally offset a positional error, or misalignment, of a geometric sensor relative to another geometric sensor by adjusting the profile data, as opposed to physically repositioning the geometric sensor. In various embodiments, the computer system may adjust a set of profile data based on the offset(s) of prior profile data from that geometric sensor relative to corresponding profile data from another geometric sensor. The adjusted set of profile data may be used in place of the original profile data in processing tasks such as profile matching, determination of object position, control of cutting/handling equipment, and the like, and/or to detect and report a misalignment of a geometric sensor. In some embodiments, the magnitude of the adjustments can be used to detect and report a misalignment of a geometric sensor.

FIGS. 6-9 illustrate flow diagrams of a virtual calibration method and processes thereof, all in accordance with various embodiments.

Figure 6:
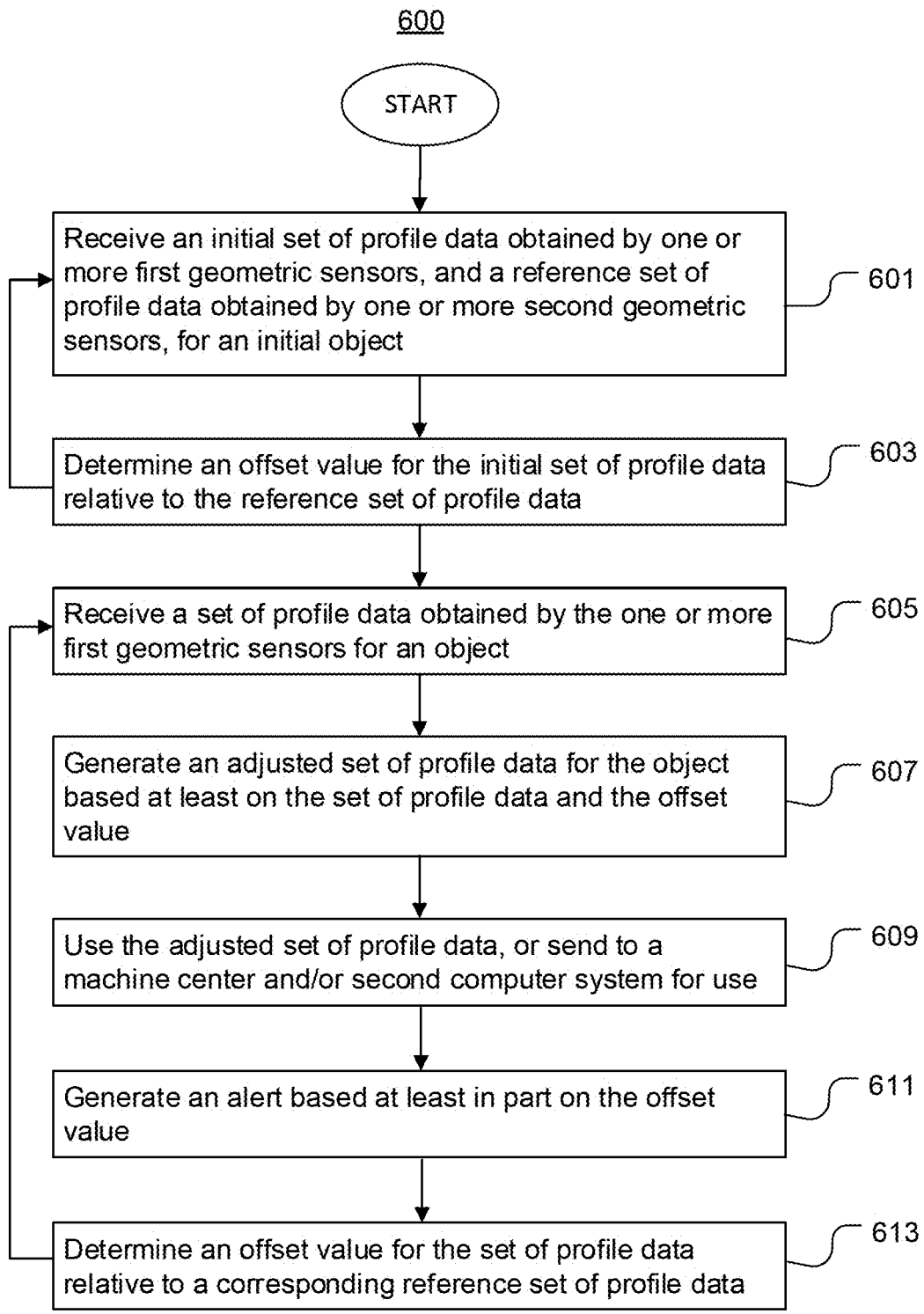
FIG. 6 is a flow diagram of a virtual calibration method.

Referring first to FIG. 6, method 600 may begin at block 601. At block 601, a computer system (e.g., computer system 106) may receive an initial set of profile data obtained by one or more first geometric sensors, and a reference set of profile data obtained by one or more second geometric sensors, for an initial object. The initial set and reference set may be received in any order, or simultaneously, depending on the application and sensor arrangement.

The first and second geometric sensors may be configured to obtain surface measurement data (e.g., distance values), filter the obtained data, and convert the filtered data to data points. Each set of profile data may include multiple groups of data points, with each group including the dimension (X,Y) coordinates of surface points at intervals along the length (Z-axis) of the workpiece. Thus, each group of data points may be a 'frame' that represents the outer shape of a corresponding cross-section (or portion thereof) of the object.

In some embodiments, the first geometric sensor(s) may be geometric sensor(s) of a first scanner, and the second geometric sensor(s) may be geometric sensor(s) of a second scanner located upstream or downstream of the first scanner (e.g., geometric sensors 102a and 102b, respectively, FIG. 4). Alternatively, the first and second geometric sensors may be geometric sensors of a single scanner (e.g., geometric sensors 102a, 102b, 102c, and/or 102d, FIG. 5). Regardless, the first geometric sensor(s) and the second geometric sensor(s) may be positioned to scan at least a portion of the initial object, such that the corresponding sets of profile data include overlapping profile data (e.g., data points that represent approximately the same location along the surface of the workpiece).

In some embodiments, the initial object may be a wood workpiece, such as a log, stem, cant, slab, flitch, board, or other piece of wood, that is scanned by the first and second geometric sensors as it is moved through the respective scan zones of those geometric sensors. Alternatively, in some embodiments the initial object may be a calibration target. A calibration target may be of any suitable size, material, and shape. Examples of calibration targets include, but are not limited to, solid or hollow objects that generally mimic the shape of a workpiece, fixed fiducials, and a conveyor or component thereof (e.g., a chain, belt, or frame), or other processing line equipment, within the respective fields of view of the first and second geometric sensors.

Figure 7:
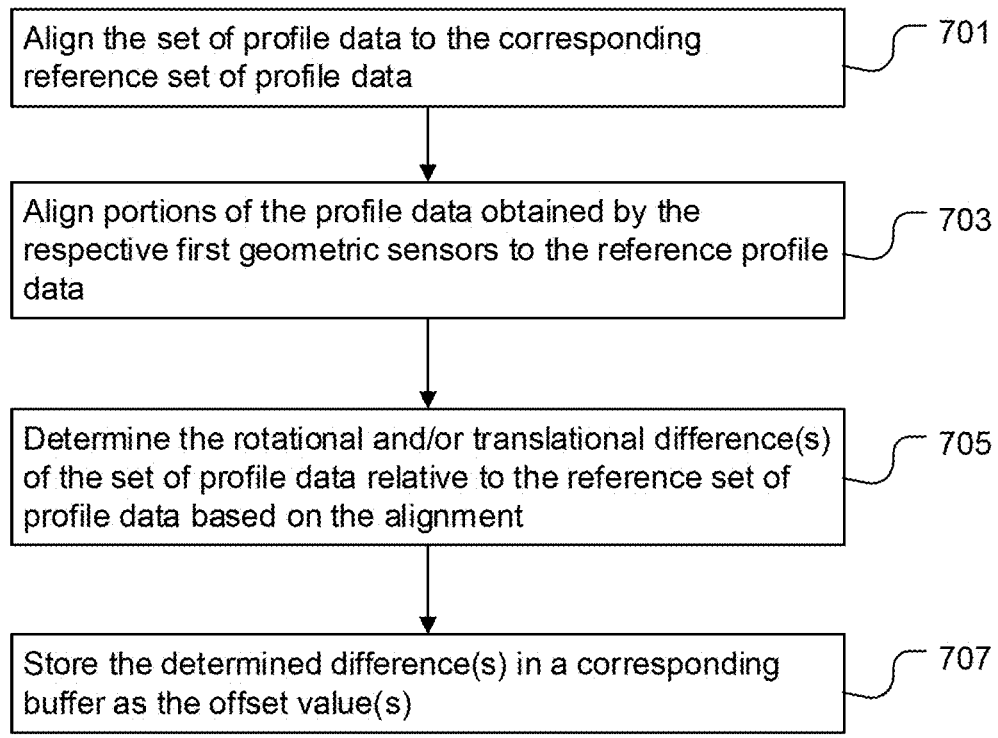
FIGS. 7-9 are flow diagrams of processes of the virtual calibration method of FIG. 6.

At block 603, the computer system may determine an offset value for the initial set of profile data relative to the reference set of profile data. An example of a process for determining an offset value is shown in FIG. 7. Referring to that Figure, at block 701 the computer system may align the initial set of profile data to the reference set of profile data. For example, if the first and second geometric sensors are geometric sensors of separate scan zones, the computer system may align the profile data by identifying a frame (e.g., a cross-section) of the reference set of profile data that matches a frame of the initial set of profile data. The computer system may identify the matching frame of the reference set of profile data in any suitable manner, such as by pairwise comparison of frames or data points and selection of the match with the highest comparison score. The computer system may use the matching frames to align the sets of profile data. Alternatively, if the first and second geometric sensors are geometric sensors of a single scanner, the computer system may align the sets of profile data by aligning the overlapping profile data. Again, the computer system may align sets of profile data in a pairwise fashion. Alternatively, the computer system may align all of the geometric sensors of a given scan zone/scanner simultaneously based on the overlapping portions of data.

Optionally, if the first and second geometric sensors are geometric sensors of separate scanners, and the first geometric sensor(s) includes multiple first geometric sensors, the method may proceed to block 703. At block 703 the computer system may align portions of the profile data obtained by each of the respective first geometric sensors to the reference set of profile data. In other embodiments, block 703 may be omitted. For example, block 703 may be omitted if only one first geometric sensor is being virtually calibrated relative to only one second geometric sensor of a different scan zone, or if the first and second geometric sensors are geometric sensors of a single scan zone.

At block 705, the computer system may determine a rotational and/or translational difference of the initial set of profile data relative to the reference set of profile data based on the alignment. Again, if there are multiple first geometric sensors, the computer system may determine a rotational and/or translational difference for each of the first geometric sensors relative to the reference set of profile data. In some embodiments blocks 701 and 703 may be performed simultaneously. For example, the computer system may use conventional image alignment algorithms or corresponding computer software that determines the rotational/translational difference(s) in the process of aligning the profile data, or vice versa.

At block 707 the computer system may store the determined rotational and/or translational difference in a buffer as an offset value. Optionally, if there are multiple first geometric sensors and the computer system determines a rotational and/or translational difference for each, the computer system may store each of the determined rotational and/or translational differences in a corresponding buffer. Thus, in such embodiments, multiple buffers may be provided, and each buffer may be used to store the offset value(s) for a corresponding one of the first geometric sensors. In other embodiments, the computer system may determine only one offset value for a single first geometric sensor, or only one offset value for multiple geometric sensors, and store the offset value in a single buffer. In some embodiments, the offset value may be the actual offset of the initial set of profile data relative to the reference set of profile data. For instance, if the initial set of profile data is offset by 3 units along the X axis and −2 units along the Y axis relative to the reference set of profile data, the offset value might be (3, −2). In other embodiments, the offset value may be the positional change required to align the initial set of profile data with the reference set of profile data. For instance, if the initial set of profile data is offset by 3 units along the X axis and −2 units along the Y axis relative to the reference set of profile data, the offset value might be (−3, 2). Regardless, the offset value may represent an X-Y offset of a set of profile data relative to a corresponding reference set of profile data. Optionally, the offset value may represent a rotational value (e.g., expressed in degrees) instead of, or in addition to, an X-Y offset.

Referring again to FIG. 6, in some embodiments blocks 601 and 603 may be repeated multiple times, with profile data from additional objects, until a desired number of offset values are stored in the buffer(s). For example, upon initial startup of the virtual calibration system, blocks 601 and 603 may be repeated until there are a predetermined number (e.g., 10, 25, 50) of offset values in the buffer(s).

In other embodiments, blocks 601 and 603 may be omitted, and method 600 may begin at block 605. For example, upon initial startup of the virtual calibration system, the computer system may assume the offset value(s) to be zero.

At block 605 the computer system may receive a set of profile data obtained by the one or more first geometric sensors for an object. If the method begins at block 605, the object may be the first object scanned. Alternatively, if the method begins at block 601, the object may be the next successive object scanned after the initial object(s). In some embodiments the object may be a wood workpiece, such as a log, stem, cant, slab, flitch, board, or other piece of wood.

Figure 8:
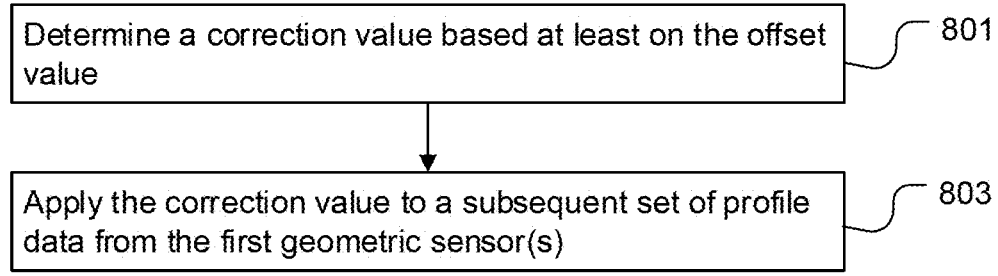

At block 607 the computer system may generate an adjusted set of profile data for the object based at least on the corresponding set of profile data and the offset value. An example of a process for generating an adjusted set of profile data is shown in FIG. 8. Referring now to that Figure, at block 801 the computer system may determine a correction value based at least on the offset value. In some embodiments, the computer system may use the most recently stored offset value for the corresponding first geometric sensor as the correction value. In other embodiments, the computer system may calculate the correction value based on a plurality of offset values stored in the corresponding buffer. For example, in some embodiments the computer system may determine the correction value as the average of a desired number (e.g., 10, 25, 50) of the most recent offset values stored in the buffer. In other embodiments the computer system may use an average or some other filter (e.g., median filter, trimmed mean, gaussian, etc.) to determine the correction value. If the first geometric sensor(s) includes multiple geometric sensors, and the computer system has determined corresponding offset values for those geometric sensors, the computer system may determine a correction value for each one individually, based on the offset value(s) stored in the corresponding buffer for that geometric sensor.

At block 803 the computer system may apply the correction value to the set of profile data to obtain the adjusted set of scan data for the object. For example, if the offset value is the actual rotational/translational offset of an initial set of profile data relative to the corresponding reference set of profile data, the computer system may apply the correction value to the new set of profile data by subtracting the offset value from some or all of the data points of the new set of profile data. If the offset value is the rotational/translational change required to align the initial set of profile data with the corresponding reference set of profile data, the computer system may apply the correction value to the new set of profile data by adding the correction value to some or all of the data points of that set.

Referring again to FIG. 6, at block 609 the computer system may use the adjusted set of profile data, and/or send it to a machine center and/or a second computer system for use, in various processing tasks (e.g., determining a change in position/orientation of the object, controlling cutting/positioning equipment to cut or position the object, determining or modifying a cut solution for the object, etc.). Optionally, the computer system may generate and send commands to an output device (e.g., a monitor) to display the correction value. In some embodiments, the computer system may use the adjusted set of profile data to generate a 3D model of the object.

For example, the computer system may generate the 3D model by assembling the adjusted set of profile data. Alternatively, the computer system may generate the 3D model by interpolating between the groups of data points of the adjusted set of profile data to create new groups of data points at desired intervals along the longitudinal axis of the object (e.g., to generate cross sections on ½ inch centers). The computer system may use the 3D model to control cutting/positioning equipment to cut or reposition the object, to determine or modify a desired position for the object, and/or to determine or modify a cut solution for the object. As another example, the computer system may compare the adjusted set of profile data and/or the 3D model to another adjusted set of profile data and/or 3D model of the object to assess a change in the position/orientation of the object.

Figure 9:
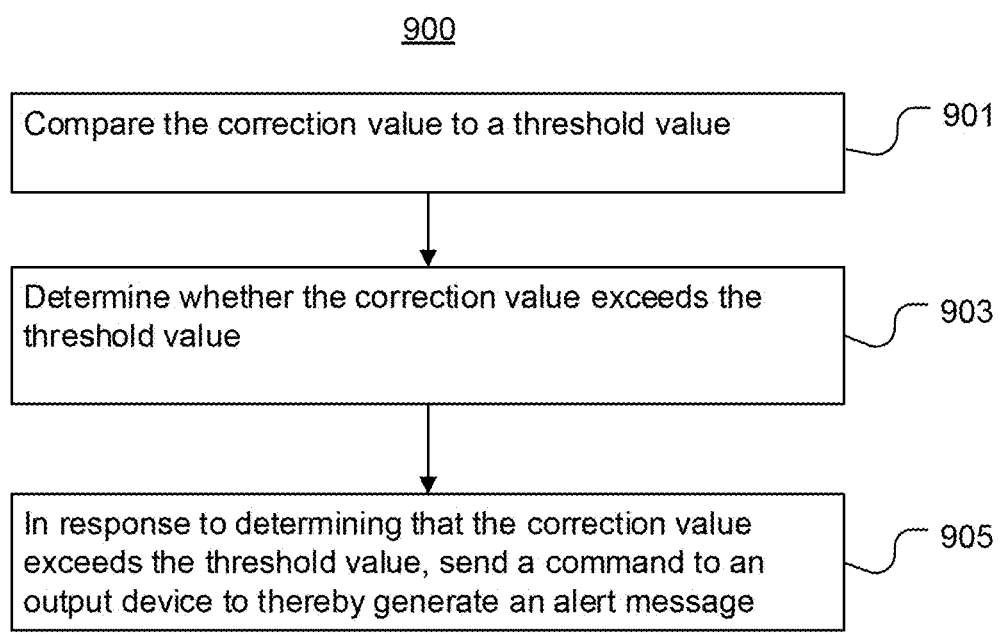

Optionally, at block 611 the computer system may generate an alert based at least in part on the offset value. An example of a process for generating an alert based at least in part on the offset value is shown in FIG. 9. Referring now to that Figure, at block 901 the computer system may compare the correction value to a threshold value. The threshold value may represent a maximum permitted correction value. At block 903, the computer system may determine, based on the comparison, whether the correction value exceeds the threshold value. If the determined correction value exceeds the threshold value, at block 905 the computer system may generate and send one or more commands to an output device (e.g., output device 128) to thereby cause the output device to output an alert, such as a visual display and/or audible alert. In other embodiments, the computer system may compare the offset value to the threshold value instead of the correction value, determine whether the offset value exceeds the threshold value, and send the command(s) to the output device in response to a determination that the offset value exceeds the threshold value. Regardless, the alert message may recommend and/or instruct an adjustment to the position of a corresponding one of the geometric sensors. Some embodiments may omit block 609 or block 611.

At block 613 the computer system may determine an offset value for the (unadjusted) set of profile data relative to a corresponding reference set of profile data obtained by the second geometric sensor(s). The computer system may determine the offset value in the same or similar manner as described above with regard to block 603 and FIG. 7. The computer system may receive the corresponding reference set of profile data at block 613, or at block 605 or any of blocks 607-611.

In various embodiments, additional objects may be scanned in succession by the first and second geometric sensors, and the computer system may repeat blocks 605, 607, and 613 (and optionally, block 609 and/or 611) with some or all of the new sets of profile data and corresponding sets of reference profile data. In some embodiments, the correction value may be recalculated for each successive workpiece. In other embodiments, the correction value may be recalculated for some, but not all, of the successive workpieces. For example, the correction value may be recalculated for every second workpiece, every fifth workpiece, or the like. As another example, the correction value may be recalculated at defined times (e.g., 8 am each day), or upon the occurrence of a particular event (e.g., at the beginning of each new shift in the production facility, or upon startup of the processing line after a stoppage), or in response to input from an operator (e.g., through a keyboard, touchscreen, button, joystick, etc.).

Virtually calibrating geometric sensors/scanners on a continuous or semi-continuous basis may help to maintain productivity by reducing unscheduled downtime along a production line. Without a virtual calibration system, the operator may need to stop the production line to correct even a relatively small misalignment of a geometric sensor. Using virtual calibration methods may effectively increase the tolerance of the processing line to positional changes of geometric sensors induced by vibrations, impacts, and heating/cooling cycles, allowing the processing line to continue operating until the geometric sensors can be physically recalibrated during a planned shutdown.

In various embodiments, virtual calibration systems and methods may be implemented along processing lines of facilities that manufacture wood or wood-based products such as lumber, veneer, and engineered wood beams, sheet materials, and the like. As an example, FIGS. 10-14 and the corresponding text describe possible implementations of virtual calibration systems along two processing lines of a lumber manufacturing facility. This example is provided merely by way of explanation, and the implementation and use of virtual calibration systems and methods in other types of facilities, with other types and arrangements of equipment, will be readily apparent to those with ordinary skill in the art in possession of the present disclosure. Such alternatives are expressly contemplated and encompassed herein.

Figure 10:
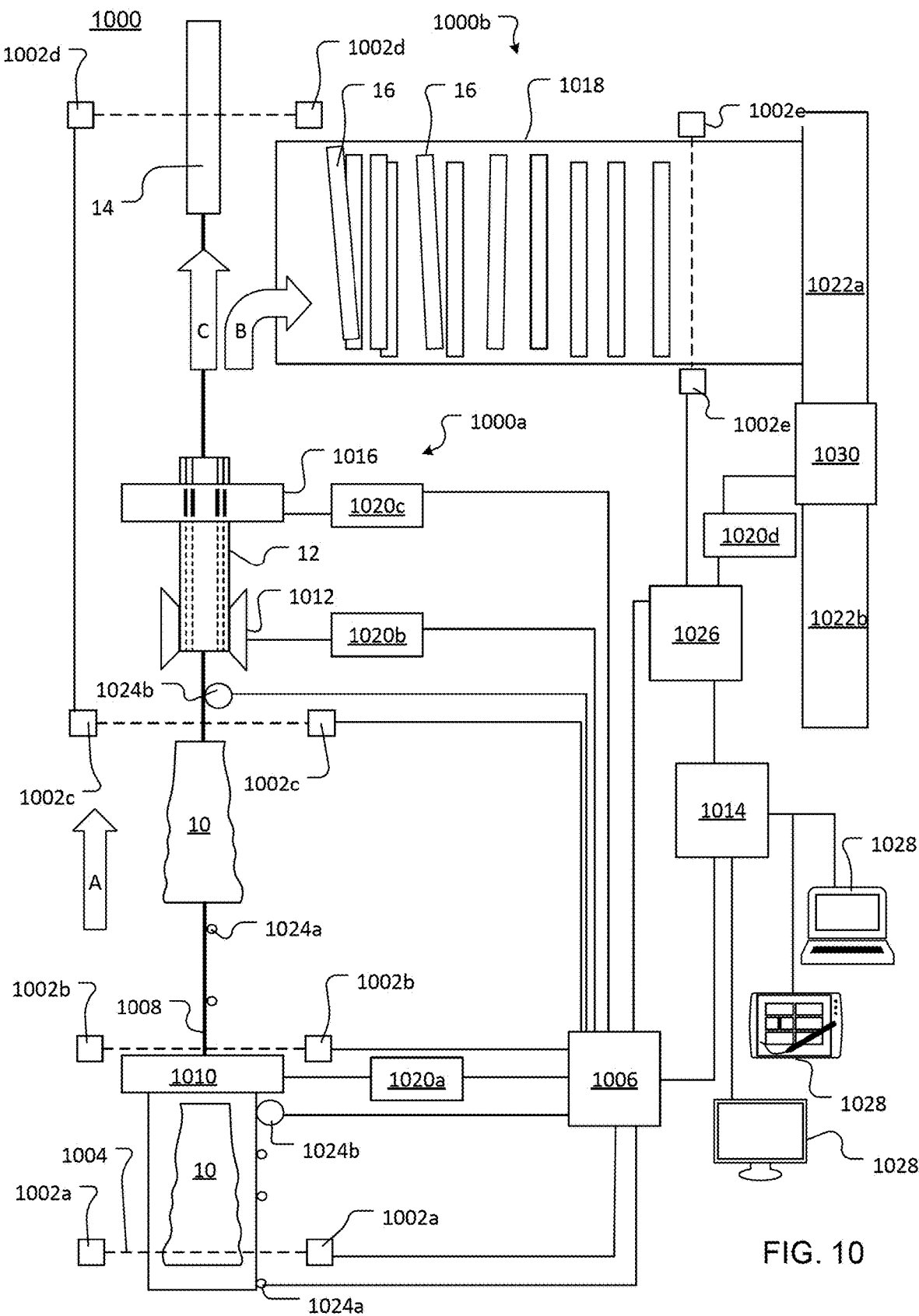
FIG. 10 shows a schematic plan view of lumber processing lines with a virtual calibration system.
Figure 11:
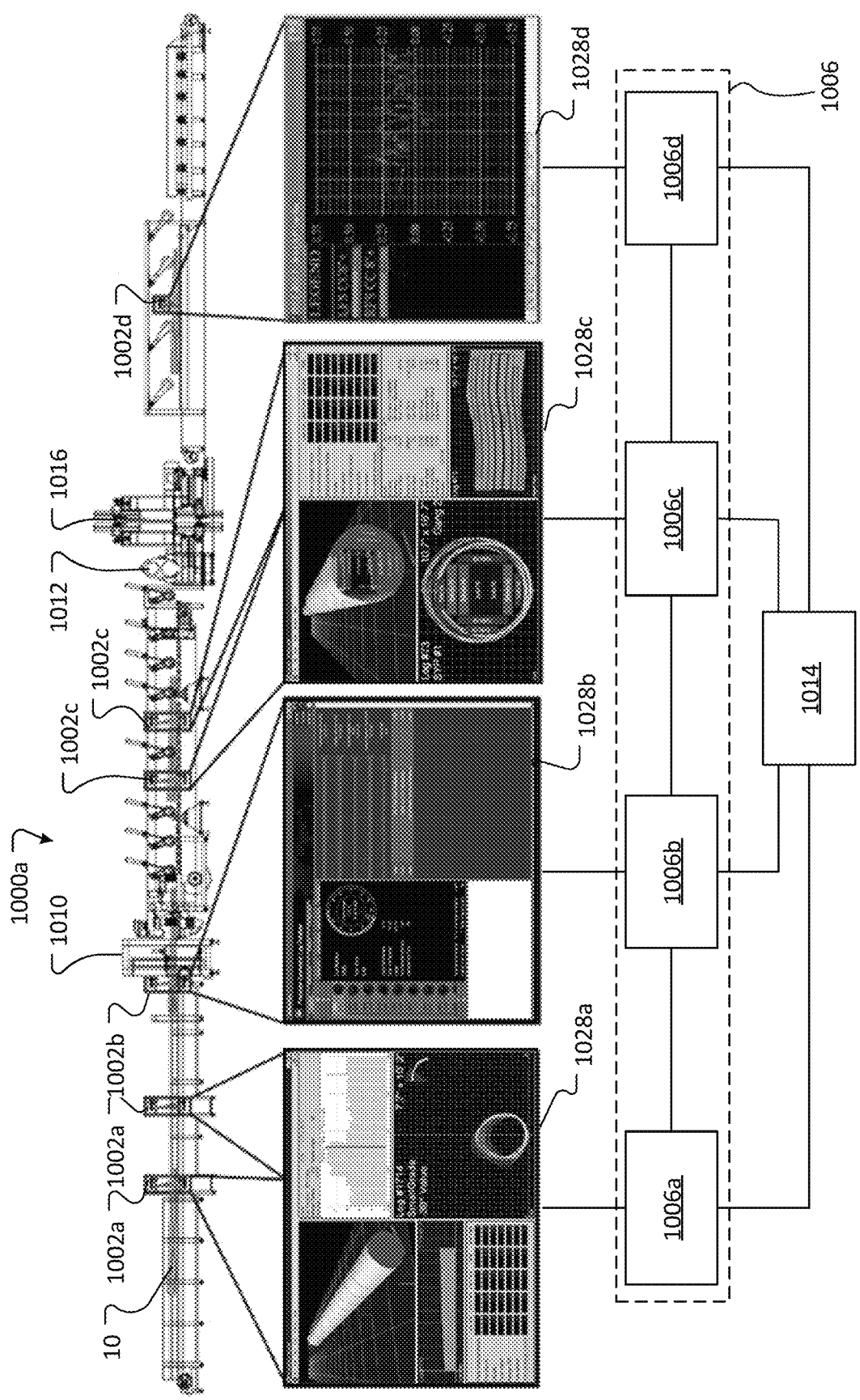
FIG. 11 shows a side elevational view of a lumber processing line with a virtual calibration system, and corresponding computer system operations.

Referring now to FIGS. 10-11, FIG. 10 illustrates a lumber processing system 1000 with a primary processing line 1000*a* and a secondary processing line 1000*b*, and FIG. 11 shows a side elevational view of primary processing line 1000*a* and corresponding operations of a computer system.

Primary breakdown line 1000*a* may include a log turner 1010, a chipper 1012, saws 1016, and a transport system 1008 configured to convey logs 10 and cants 12 (and optionally, center cants 14) along a path of flow that extends through the log turner and the cutting devices. Many other configurations are also possible. For example, a primary breakdown line may have a saw center (e.g., one or more band saws or paired circular saws) upstream of saws 1016 instead of a chipper. As another example, a profiler module may be provided between chipper 1012 and saws 1016, or combined with saws 1016 in a single module.

Transport system 1008 may include any suitable number, type(s), and combination of transfers, conveyors, and/or positioning devices (e.g., feed rolls, positioning pins/rolls, hold down rolls, lifts, skids/pans, ramps, etc.). Transport system 1008 may define a path of flow through the log turner 1010, chipper 1012, and saws 1016. For example, transport system 1008 may include a flighted chain conveyor that transports logs to the log turner, a sharp chain conveyor that transports the logs into/through chipper 1012, and another conveyor and/or paired feed rolls that feed the resulting cants into saws 1016. Optionally, transport system 1008 may be selectively operable to skew and/or slew the logs or cants while feeding them into or through the chipper, saws, or other machine center.

Log turner 1010, chipper 1012, and saws 1016 may be conventional devices of any suitable configuration. For example, log turner 1010 may be a roll-type, ring-type, sharp chain-type, rotary, knuckle, or other type of log turner. Chipper 1012 may have one or more conical, drum-style, or other type of chip heads. Optionally, chipper 1012 may be a chipper-canter (e.g., a vee chipper-canter, horizontal chipper-canter, or vertical chipper-canter). Saws 1016 may include one or more band saws and/or circular saws. For example, saws 1016 may be a quad bandmill or a quad arbor saw. The primary breakdown line 1000*a* may further include other handling or positioning devices such as positioning/feed rolls, hold down rolls, lift pans/skids, and the like.

In various embodiments, the secondary breakdown line 1000b may include an edger infeed 1022a, an edger 1030, an edger outfeed 1022b, and a transport system 1018 configured to convey cut pieces of wood (e.g., flitches, cants, or slabs) from transport system 1008 to edger infeed 1022a. Any or all of these components may be conventional. Transport system 1018 may have any suitable number and combination of transfers, conveyors, positioning devices, and the like. For example, transport system 1018 may include a queuing deck, an unscrambler downstream of the queuing deck, and a lugged chain conveyor between the unscrambler and the edger infeed. Optionally, a lug loader and/or lumber indexing devices such as duckers, pins/stops, or other such devices may be provided between the unscrambler and the lugged chain conveyor to deal the flitches into corresponding lug spaces. Other equipment may be provided along transport system 1018, such as cross-cut saws, drop-out gates/diverters, ending rolls/positioning fences, overhead vision cameras, and the like. Although the transport system 1018 shown in FIG. 10 includes a transverse conveyor, in other embodiments the transport system may be (or may include) a lineal conveyor.

Edger infeed 1022a may be a conventional edger infeed with one or more conveyors operable to move workpieces into the edger. Optionally, edger infeed 1022a may include hold-down rolls above the conveyor(s). In some embodiments transport system 1018 and/or edger infeed 1022a may include a positioning system selectively operable to place the flitches onto the edger infeed 1022a in desired positions for cutting. For example, the positioning system may include pins or conveyors that are independently operable to position the flitches onto the ramps, and the ramps may be operable to lower the repositioned flitches onto the edger infeed 1022a. In various embodiments, transport system 1018 and/or edger infeed 1022a may further include various other devices such as ending rolls, board/flitch turners, duckers/stops, drop-out gates, and the like.

Edger 1030 may be a straight-sawing, curve-sawing, gang, or other type of edger. In some embodiments edger 1030 may be a conventional edger with one or more saws operable to cut flitches into boards. Optionally, edger 1030 may also include side chippers, a reman head, and/or other features.

The lumber processing system may have a scanner optimizer system that includes one or more scanners, each with at least one geometric sensor 1002, and a computer system operatively coupled with the scanner(s)/geometric sensors. (Although some scanner optimizer systems may have scanning devices that do not include geometric sensors, the term "scanner" as used herein refers exclusively to scanning devices with at least one geometric sensor.) Each scanner may be positioned to scan workpieces within a respective scan zone.

As shown for example in FIG. 10, a first scanner with geometric sensors 1002a may be positioned to scan logs 10 as they are conveyed on transport system 1008 through a first scan zone located upstream of the log turner 1010. A second scanner with geometric sensors 1002b may be positioned to scan the logs in a second scan zone located near the log turner 1010, just downstream of the log turner (FIG. 10) or just upstream of the log turner (FIG. 11). A third scanner with geometric sensors 1002c may be positioned to scan the logs 10 or cants 12 in a third scan zone located between the second scan zone and the saws 1016, either upstream or downstream of the chipper 1012. A fourth scanner with geometric sensors 1002d may be positioned downstream of the saws 1016 to scan the center cants 14 in a fourth scan zone after flitches 16 are sawn from the cants 12. A fifth scanner with geometric sensors 1002e may be positioned to scan the flitches 16 in a fifth scan zone located along transport 1018 upstream of edger 1030.

In various embodiments, each of the first, second, and third scanners of the primary processing line may include two or more geometric sensors. In a particular embodiment each of the first, second, and third scanners of the primary processing line includes at least one group of four or five geometric sensors arranged around the path of flow (see e.g., FIGS. 2A-C), the fourth scanner includes two geometric sensors arranged above and below, or on opposite sides of, the path of flow (see e.g., FIGS. 2D, 2E), and the fifth scanner along the secondary processing line includes one or more rows of geometric sensors above and/or below the flow path, with 6-14 geometric sensors in each row (see FIGS. 3A-C). Any or all of these scanners may include one or more additional groups of geometric sensors arranged to form sub-zones of the corresponding scan zone (see e.g., FIG. 11). For example, as illustrated in FIG. 11, the geometric sensors 1002a of the first scanner may be arranged to form two sub-zones, and the geometric sensors 1002c of the third scanner may be arranged to form two sub-zones. The number, locations, and arrangement of scanners and geometric sensors varies among embodiments, and such variations will be readily apparent to those with ordinary skill in the art.

The scanner optimizer system may include any suitable number of computers and computer systems. For example, in a facility with a primary processing line and a secondary processing line, the scanner optimizer system may include a first computer system 1006 operatively coupled with some or all of the geometric sensors 1002 of the primary processing line and a second computer system 1026 operatively coupled with some or all of the geometric sensors 1002 of the secondary processing line. Optionally, the scanner optimizer system may further include a third computer system 1014 operatively coupled with computer system 1006 and/or 1026. Alternatively, the scanner optimizer system may include only one or two, or more than three, computer systems. Any or all of the computer systems may include, or may be operatively coupled with, one or more output devices 1028 such as monitors, speakers, projectors, portable electronic devices (e.g., laptops, tablets, netbooks, smartphones), and/or other devices used within the facility to monitor operations therein.

Each computer system may include one or more computers, programmable logic controllers, and/or motion controllers, in any suitable number and combination. For example, first computer system 1006 may include computers 1006a, 1006b, 1006c, and 1006d operatively coupled with corresponding geometric sensors (e.g., geometric sensors 1002a, 1002b, 1002c, and 1002d, respectively), and may optionally include one or more controllers 1020a, 1020b, 1020c operatively coupled with one or more of the computers. Second computer system 1026 may include a computer operatively coupled with geometric sensors 1002e, and may optionally include one or more controllers (e.g., 1020d) operatively coupled with the computer. In various embodiments, each of the controllers 1020a, 1020b, 1020c, and 1020d may include a programmable logic controller (PLC) and a motion controller in communication with the PLC and a corresponding machine center (e.g., log turner 1010, chipper 1012, saws 1016, edger 1030) and/or handling equipment (e.g., centering/feed rolls, hold down rolls, conveyor(s), positioning pins, and the like). Signals may be transmitted from the computer to the PLC, from the PLC to the motion controller, and from the motion controller to the machine center or handling equipment, and vice versa. However, in some embodiments a PLC may send signals directly to a machine center and/or handling equipment, and the motion controller may be omitted or arranged to communicate directly with the computer.

In some embodiments, the scanner optimizer system or computer system(s) may further include one or more position indicator devices, such as photo-eyes 1024a and/or encoders 1024b, configured to generate data used by the scanner optimizer system to determine and/or control the position and/or travel speed of workpieces on transport systems 1008/1018. Other examples of position indicator devices include, but are not limited to, overhead cameras, light curtains, linear position sensors/transducers, and the like. The number, type, and placement of position indicator devices may vary among embodiments. For example, the position indicator device(s) may be used by the scanner optimizer system to coordinate operations of the sensors, conveyor systems, cutting devices, positioning/handling equipment, and/or data transfer among computer systems performing the methods described herein. In some embodiments position indicator devices may also be used by the scanner optimizer system to aid in matching profile data received from multiple scanners for a given workpiece (e.g., by synchronizing data capture or matching frames along the Z-axis of the workpiece).

As workpieces are conveyed along the processing lines and through the successive scan zones, the respective computer systems may use the profile data collected by the scanners to determine how the workpieces should be positioned for the next stage of processing, how they should be cut, and how the positioning and cutting devices should be moved and operated to reposition and cut the workpiece. This may require the computer system(s) to compare and match profile data from two scanners or from two geometric sensors of the same scanner. Misalignment of one of the scanners or geometric sensors relative to the other may impede the matching process.

Therefore, a virtual calibration system may be implemented along either or both of the processing lines. Operations of the processing lines 1000a and 1000b before and after implementation of a virtual calibration system are described below by way of example.

Before Implementation of a Virtual Calibration System:

Without a virtual calibration system, processing lines 1000a and 1000b may operate generally as follows. First transport system 1008 may convey a log 10 through the first scan zone to the log turner 1010. Computer 1006a may receive the profile data from the geometric sensors 1002a and may generate a 3D model of the log by assembling the received data points, or by interpolating between the groups of data points of the received set of profile data to create new groups of data points at desired intervals (e.g., for cross sections on ½ inch centers) along the longitudinal axis of the log and assembling the new groups of data points. Computer system 1006a may use the 3D model to determine a desired rotational position, and optionally a desired skew/slew position, for the log. For example, computer system 1006a may determine the desired position based on the predicted stability of the log in different positions on a conveyance (e.g., a sharp chain) and/or the value of potential cut solutions for the log in some or all of those positions. Computer 1006a may send the desired rotational position and the received profile data, and optionally the 3D model and/or other data, to computer 1006b. In addition, computer 1006a may send the received profile data and/or 3D model to computer 1006c. Computer 1006a may also send commands to a computer display/monitor to display the 3D virtual model, actual position, desired rotational position, and/or other information about the log.

The log may be scanned again by geometric sensors 1002b while the log turner is turning the log and advancing the log in the flow direction. As computer 1006b receives the cross sections (groups of data points) from geometric sensors 1002b, computer 1006b may compare them to the corresponding cross sections of the profile data obtained by geometric sensors 1002a and calculate the rotational differences. Computer 1006b may use the determined rotational differences to monitor changes in the rotational angle of the log, relative to the initial orientation of the log at the first scan zone. Based on the detected rotational differences (and optionally, additional factors such as the rotation speed of the log turner, conveyor speed, log diameter, and the like), computer 1006b may identify and/or predict turn error and generate commands to adjust operation of the log turner accordingly (e.g., to speed up, slow down, or reverse the direction of rotation, and/or to perform another rotation of the log) to turn the log toward the desired rotational position. After the log has been turned, and optionally skewed/slewed, the log may be deposited onto the next portion of first transport system 1008 (e.g., a sharp chain) and conveyed through the third scan zone toward chipper 1012 and saws 1016. Optionally, computer 1006b may send commands to a computer display/monitor to display the 3D virtual model, current rotational position, desired rotational position, predicted final turn angle, turn angle error, and/or other such information.

Geometric sensors 1002c may scan the log 10 (or the cant 12, if the scan zone is between the chipper 1012 and saws 1016). Computer 1006c may use the profile data from geometric sensors 1002c to generate a new 3D model of the log generally as described above (e.g., by assembling the received profile data or interpolating between the received cross sections to generate and assemble new cross sections). Computer 1006c may use the received set of profile data and/or new 3D model to determine an optimized cut solution for the log and to generate commands to control the chipper 1012 and saws 1016 to chip the log into a cant and cut flitches from the cant according to the optimized cut solution. Computer 1006c may compare the sets of profile data from geometric sensors 1002c and 1002a (or corresponding 3D models) to determine a final position of the log on the conveyance (e.g., a sharp chain). Optionally, computer 1006c may compare the final position of the log to a cut solution and/or desired rotational position determined by computer 1006a, and adjust the cut solution (or calculate a new cut solution) to offset a difference between the desired position of the log on the sharp chain and the actual position of the log on the sharp chain. Alternatively, computer 1006c may use the set of profile data received from geometric sensors 1002c and/or the corresponding 3D model to determine an optimized cut solution for the log, and may generate commands (e.g., to controller 1020c) to control the saws 1016 to cut flitches from the cant according to the optimized cut solution. If the scan zone of geometric sensors 1002c is upstream of the chipper 1012, computer 1006c may also generate commands to control the chipper 1012 to chip the log into the cant according to the optimized cut solution. Computer 1006c may send commands to a computer display/monitor to display the 3D virtual model, final position, cut solution, and/or other such information.

The remaining center cant 14 may be conveyed through the fourth scan zone and scanned by geometric sensors 1002d. Computer 1006d may use the profile data from geometric sensors 1002d to create a 3D virtual model of the actual center cant as described above, and/or may apply the cut solution to a 3D virtual model generated by another computer (e.g., computer 1006a) to create a 3D model of the expected center cant. In any case, computer 1006d may use the profile data from geometric sensors 1002d to assess the performance of the chipper or saws, and/or to generate commands to control downstream cutting equipment (e.g., a gang saw) to cut the center cant into boards. For example, computer 1006d may compare one or more actual dimensions of the center cant (e.g., the width of the cut faces, overall width of the cant, distances of the cut faces from the centerline/chain, etc.) to the expected dimensions of the center cant defined by the cut solution to determine whether the saws 1016 and/or chipper 1012 are cutting the cant accurately, whether any of the saws 1016 are 'snaking,' whether the chip heads are chipping at the correct distance from the center line/sharp chain, and the like. Computer 1006d may send commands to a computer display/monitor, to display information about the performance of the saws 1016 and/or chipper 1012. Computer 1006d may also send commands (e.g., to a controller) to control another set of saws, such as a gang saw, to cut the center cant into boards.

The flitches 16 may be diverted to the transport system 1018 and singulated along the transport system 1018 (e.g., by an unscrambler) before passing individually through the scan zone of another scanner with sensors 1002e. The second computer system 1026 may use the set of profile data from geometric sensors 1002e to generate a 3D model of the flitch as described above (e.g., by assembling the received profile data or interpolating between the received cross sections to generate and assemble new cross sections). The second computer system 1026 may use the 3D model to determine an optimized cut solution for the flitch, and may use both the 3D model and the optimized cut solution to determine a desired position for the flitch relative to edger infeed 1022a (i.e., a position in which the flitch could be cut by the edger according to the cut solution). The second computer system 1026 may generate commands (e.g., to a controller) to control cutting and positioning equipment (e.g., edger infeed 1022a, edger 1030, and/or positioning equipment such as pins, belts, rollers, and the like) to reposition and cut the flitch into one or more boards according to the optimized cut solution for the flitch. The second computer system 1026 may send commands to a computer display/monitor to display a 3D model of the flitch, the cut solution for the flitch, the current or expected positions of the edger saws relative to the current or expected position of the flitch, and/or other such information.

The third computer system 1014 may receive data from the first and/or second computer system(s) and use the data to perform any of the operations attributed above to the other computers or computer systems.

As workpieces are processed, the geometric sensors may be subjected to vibration, impacts, heating/cooling cycles, and other such factors. As the geometric sensors become misaligned, the profile data obtained by the geometric sensors also becomes misaligned relative to the profile data from other geometric sensors. This may reduce the speed and/or accuracy of the matching process performed by the computer system, which may in turn result in slower processing line speeds and/or less accurate cutting and positioning of workpieces.

After Implementation of a virtual calibration system:

Therefore, processing lines 1000a and 1000b may be provided with a virtual calibration system by programming any or all of computer systems 1006, 1026, and/or 1014 to perform a virtual calibration method. For example, computer systems 1006 and 1026 may be programmed to perform methods 1200 and 1300, respectively, described in further detail below. Alternatively, computer systems 1006, 1026, and/or 1014 may be programmed to perform method 600. Regardless, the resulting virtual calibration system may include the computer system(s) with such programming and the geometric sensors that are operatively coupled thereto.

With a virtual calibration system, the processing lines 1000a and 1000b may operate generally as follows. A log 10 may be conveyed on first transport system 1008 through the first scan zone to the log turner. Geometric sensors 1002a may scan the log 10, and computer 1006a may receive the profile data from the geometric sensors 1002a. Optionally, computer system 1006a may generate a 3D model of the log by assembling the received data points, or by interpolating between the groups of data points of the received set of profile data to create new groups of data points at desired intervals (e.g., for cross sections on ½ inch centers) along the longitudinal axis of the log and assembling the new groups of data points. Computer system 1006a may use the 3D model to determine a desired rotational position, and optionally a desired skew/slew position, for the log. For example, computer system 1006a may determine the desired position based on the predicted stability of the log in different positions on a sharp chain and/or the value of potential cut solutions for the log in some or all of those positions. Computer 1006a may send the desired rotational position and the received profile data, and optionally the 3D model and/or other data, to computer 1002b. In addition, computer 1006a may send the received profile data and/or 3D model to computer 1006c. Computer 1006a may also send commands to an output device (e.g., output device 1028), such as a computer display/monitor, to display the 3D virtual model, position information, and/or other information about the log via a user interface 1028a. In some embodiments, the profile data received from the geometric sensors 1002a may be used as the 'reference' profile data by computers 1002b, 1002c, and/or 1002d.

Alternatively, computer 1006a may perform a virtual calibration method to adjust the profile data received from geometric sensors 1002a, and use the adjusted set of profile data (instead of the profile data received from the geometric sensors 1002a) to generate the 3D model. Computer 1006a may then use the 3D model to perform the other operations described above with reference to computer 1006a. For example, the virtual calibration system may further include an additional scanner or geometric sensor(s) located upstream of geometric sensors 1002a, and computer 1006a may use the profile data received from that scanner or geometric sensor(s) as the 'reference' profile data. In that case, computer 1006a may determine the positional offsets of profile data from geometric sensors 1002a relative to the corresponding 'reference' profile data, determine correction values based on the offset values, and apply the correction values to the profile data received from geometric sensors 1002a to obtain the adjusted profile data. In such embodiments, the 'reference' profile data obtained by the additional scanner/geometric sensors may also be used as the 'reference' profile data by computers 1002b, 1002c, and/or 1002d. Alternatively, the profile data obtained by geometric sensors 1002a may be used as the 'reference' profile data by any or all of those computers. Optionally, computer 1006a may also send commands to the output device to display the current correction values, offset values, misalignment warnings, and/or other information about the alignment of geometric sensors 1002a instead of, or in addition to, the information about the log via the user interface 1028a.

The log may be scanned again by geometric sensors 1002b while the log turner is turning the log and advancing the log in the flow direction. However, instead of comparing the cross sections of profile data received from geometric sensors 1002b to the corresponding cross sections received from geometric sensors 1002a, computer 1006b may perform a virtual calibration method to adjust the profile data received from geometric sensors 1002b, and may match the adjusted profile data (instead of the unadjusted profile data) to the profile data from geometric sensors 1002a to determine the rotational differences. Computer 1006b may use the determined rotational differences to monitor changes in the rotational angle of the log, relative to the initial orientation of the log at the first scan zone. Based on the detected rotational differences (and optionally, additional factors such as the rotation speed of the log turner, conveyor speed, log diameter, and the like), computer 1006b may identify and/or predict turn error and generate commands to adjust operation of the log turner accordingly (e.g., to speed up, slow down, or reverse the direction of rotation, and/or to perform another rotation of the log) to turn the log toward the desired rotational position, and optionally to skew/slew the log. After the log has been turned, and skewed/slewed if necessary, the log may be deposited onto the next portion of first transport system 1008 (e.g., a sharp chain) and conveyed through the third scan zone toward chipper 1012 and saws 1016.

After the log has been repositioned and deposited onto the next portion of first transport system 1008 (e.g., a sharp chain), and conveyed through the third scan zone, computer 1006c may receive the corresponding set of profile data from geometric sensors 1002c. In some embodiments, computer 1006c may use the profile data from geometric sensors 1002c in the same manner as before the implementation of the virtual calibration system. In other embodiments, computer 1006c may perform a virtual calibration method to adjust the profile data received from geometric sensors 1002c, and may use the adjusted profile data in place of the unadjusted profile data for various processing tasks. For example, computer 1006c may match the adjusted profile data to the profile data from the 'reference' scanner/geometric sensor (or match the corresponding 3D models) to determine a difference between the expected position of the log on the sharp chain and the actual position of the log on the sharp chain. In that case, computer 1006c may adjust a cut solution determined by computer 1006a, and/or adjust the positions or operation of downstream cutting or handling equipment, to offset the difference. In some embodiments computer 1006c may use the adjusted profile data to generate a 3D model (e.g., by assembling the received profile data or interpolating between the received cross sections to generate and assemble new cross sections), and use the new 3D model to determine an optimized cut solution for the log and to generate commands to control the chipper 1012 and saws 1016 to chip and cut the log according to the optimized cut solution.

The remaining center cant may be conveyed through the fourth scan zone, and computer 1006d may receive the profile data from geometric sensors 1002d. Optionally, computer 1006d may perform a virtual calibration method to adjust the received profile data, and may use the adjusted profile data instead of the received profile data to assess the performance of the chipper or saws, and/or to generate commands to control downstream cutting equipment (e.g., a gang saw) to cut the center cant into boards. For example, computer 1006d may match the new set of adjusted profile data to the adjusted profile data generated by computer 1006c (or match the corresponding 3D models) to measure parameters such as the thicknesses of the flitches cut from the cants and/or the locations of the cuts, and compare the measured parameters to the expected parameters (e.g., as defined by the cut solution), to assess the accuracy of the cuts made by the saws 1016. In response to determining that an actual parameter is different from an expected parameter by more than a threshold amount or percentage (e.g., 0.001 inch, or 0.05%), computer system 1006d may send one or more commands to a controller (e.g., controller 1020c) to adjust the position of the corresponding saw 1016 and/or a downstream gang saw to offset the error.

The flitches may be diverted to the transport system 1018 and singulated along the transport system 1018 (e.g., by an unscrambler) before passing individually through the scan zone of another scanner with sensors 1002e. The second computer system 1026 may receive the corresponding profile data from sensors 1002e. In some embodiments the computer system 1026 may perform a virtual calibration method to adjust the received profile data, and may use the adjusted profile data instead of the received profile data in various processing tasks. For example, computer system 1026 may use the adjusted profile data to generate a 3D model of the flitch (e.g., by assembling the adjusted profile data or interpolating between the cross sections of the adjusted profile data to generate and assemble new cross sections). The second computer system 1026 may use the 3D model to determine an optimized cut solution and a desired position for the flitch, and to generate commands to control cutting and positioning equipment (e.g., edger infeed 1022a, edger 1030) to reposition and cut the flitch into one or more boards according to the optimized cut solution for the flitch.

In some embodiments, the third computer system 1014 may receive data from the geometric sensors and/or computer systems and use the data to perform some of the above operations, and/or other functions such as monitoring or analyzing the performance of the processing lines, reoptimizing cut solutions offline, and the like. For example, in some embodiments the third computer system 1014 may receive the profile data from the geometric sensors (directly, or via computer system 1006 and/or 1026), perform the virtual calibration method(s) to generate the adjusted profile data, and send the adjusted profile data to the corresponding computer system(s) for use.

Figure 12:
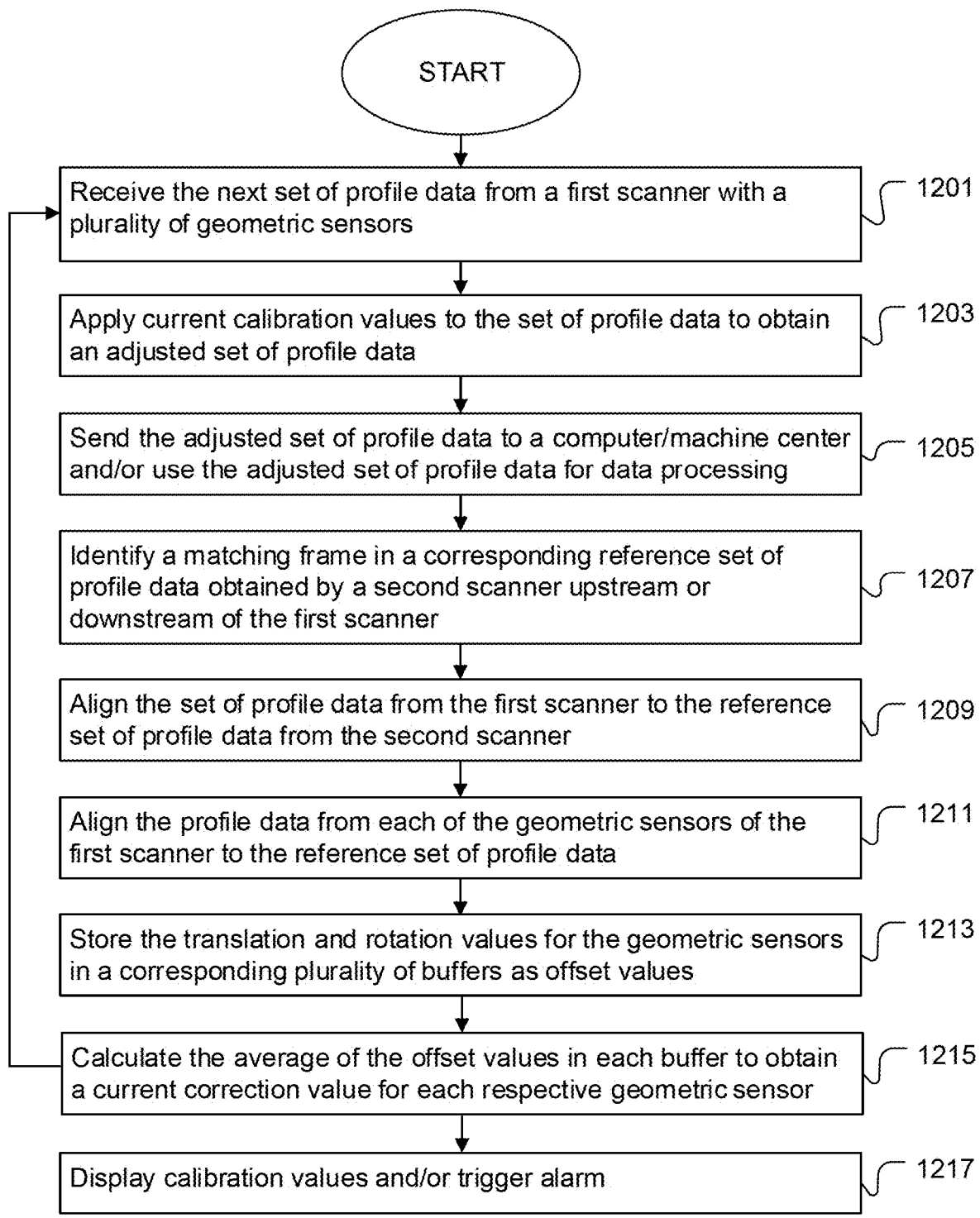
FIG. 12 is a flow diagram of a multi-zone virtual calibration method.
Figure 13:
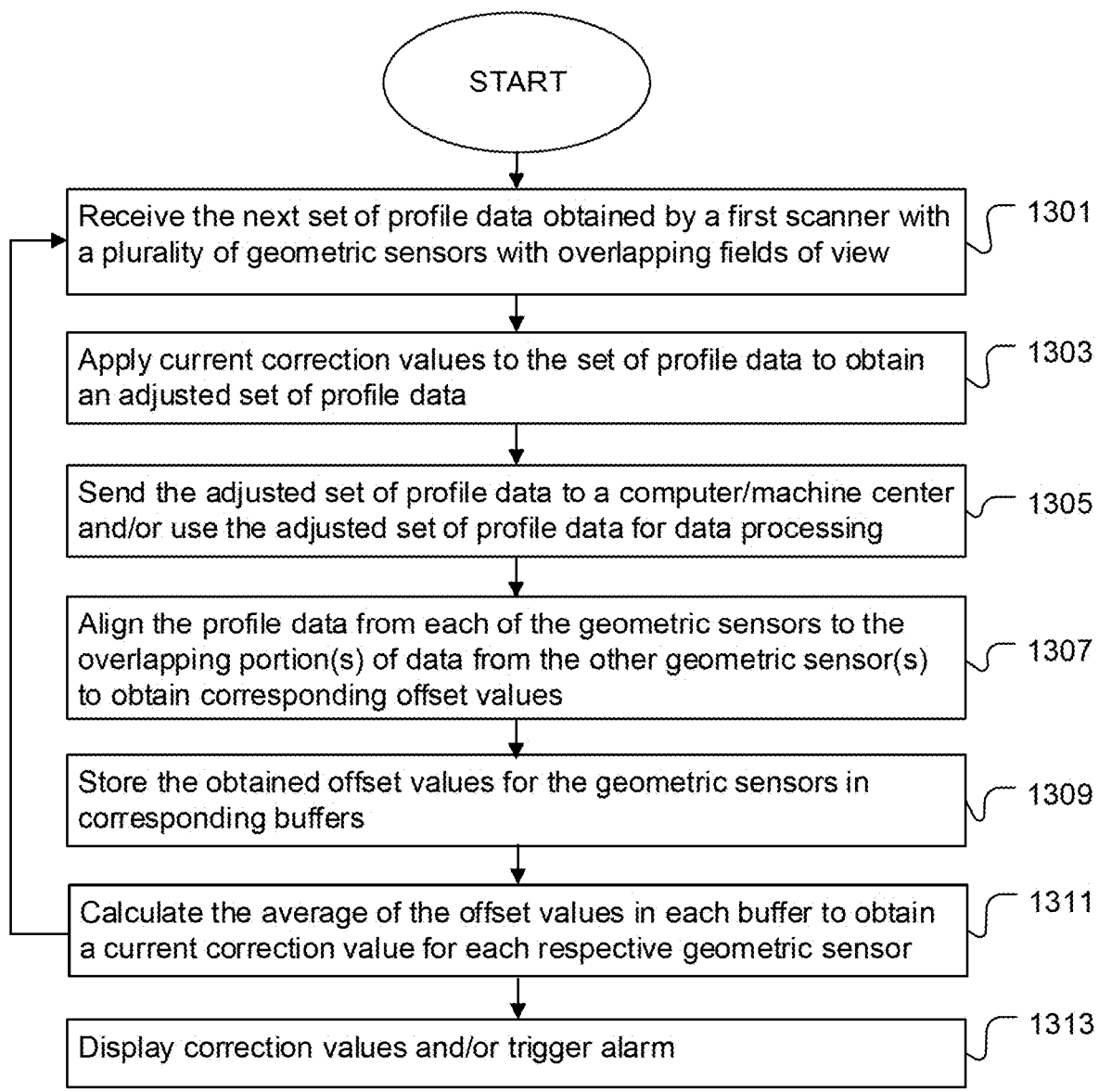
FIG. 13 is a flow diagram of a single-zone virtual calibration method.

In any case, the computer system(s) performing the virtual calibration method(s) may determine and apply correction values continuously or semi-continuously to incoming profile data as the processing line operates. Thus, in addition to generating adjusted profile data that can be matched more readily to profile data from other geometric sensors/scanners, the computer system(s) may track changes in the relative positions of the geometric sensors. If the correction value for a given sensor exceeds a threshold value, the computer system(s) may generate an alert to indicate to the operator that the physical position of the geometric sensor requires adjustment. Programming the computer system(s) to virtually calibrate the geometric sensors may improve the performance of the computer system(s) by simplifying the matching process to reduce the computational load on the processor and/or increase the rate at which the computer system can match the profile data. Regardless, the adjusted data may allow the system to run longer and perform better without stopping for manual calibration/alignment FIGS. 12 and 13 illustrate embodiments of a single-zone virtual calibration method 1200 and a multi-zone virtual calibration method 1300, respectively. For clarity, method 600 encompasses single-zone and multi-zone applications, and methods 1200 and 1300 may be considered embodiments of method 600. Therefore, the description of method 600 (and methods 700, 800, and 900) also applies to methods 1200 and 1300 unless otherwise indicated.

Referring now to FIG. 12, at block 1201 the computer system (e.g., computer system 1006 and/or 1014, computer 1006a/b/c/d) may receive profile data from a first scanner with multiple geometric sensors (e.g., geometric sensors 1002a/b/c/d). At block 1203, the computer system may apply current correction values (if any) to the profile data from the first scanner to obtain adjusted profile data. As described below with regard to block 1211, each of the current calibration values may be the average of a desired number of the most recent offset values stored in a corresponding buffer, or some other appropriate filter of the data.

At block 1205 the computer system may send the adjusted profile data to a machine center and/or use the adjusted profile data for various processing tasks. In some embodiments, the computer system may match the adjusted profile data to profile data from another scan zone to determine a change in workpiece position, size, shape, or the like. For example, computer 1006b may adjust the profile data received from geometric sensors 1002b, compare the cross sections of the adjusted profile data to the corresponding cross sections of the profile data obtained by geometric sensors 1002a to determine the rotational differences between the matched cross sections, and use the determined rotational differences to monitor changes in the rotational angle of the log while the log is rotated by the log turner. Based at least on the detected rotational differences, (and optionally, additional factors such as the rotation speed of the log turner, conveyor speed, log diameter, feedback from position indicators such as encoders and/or photo-eyes, and the like), computer 1006b may identify and/or predict turn error or final rotation angle and generate commands to adjust operation of the log turner accordingly (e.g., to speed up, slow down, or reverse the direction of rotation, and/or to perform another rotation of the log) to turn the log toward the desired rotational position. For example, computer 1006b may use such the detected differences to predict the log's final rotational angle, compare the predicted final rotational angle to the desired/optimized rotational angle, and determine a difference between the two angles. Based on the difference, computer 1006b may generate commands to a controller (e.g., 1020a of FIG. 10), such as a programmable logic controller (PLC) and a motion controller, to speed up, slow down, or reverse the direction of rotation by the log turner 1010 during the turn, or to turn the log again after a first rotation, until the log is substantially in the desired position. In some embodiments, the computer system may use adjusted profile data to generate a 3D virtual model of the workpiece and determine a cut solution and/or desired position for the workpiece based on the 3D virtual model.

At block 1207 the computer system may compare the profile data received from the first geometric sensors (e.g., geometric sensors 1002b) to a corresponding reference set of profile data from the geometric sensors of a second scanner (e.g., geometric sensors 1002a) located upstream or downstream of the first geometric sensors to identify a matching frame of the reference set of profile data. The computer system may identify the matching frame of the reference set of profile data in any suitable manner, such as by pairwise comparison of frames or data points and selection of the match with the highest comparison score.

At block 1209 the computer system may align the set of profile data from the first scanner to the reference set of profile data from the second scanner. At block 1211 the computer system may align the profile data from each of the first geometric sensors to the reference set of profile data to obtain corresponding translation and/or rotation values for the first geometric sensors. The computer system may store these values as offset values in corresponding buffers at block 1213. In some embodiments, an offset value may be an X-Y offset. In other embodiments, an offset value may include an X-Y offset and a rotational offset (e.g. expressed in degrees).

At block 1215 the computer system may calculate the average of a desired number (e.g., 50) of the most recent offset values in each buffer to obtain a current correction value for each of the first geometric sensors. Optionally, at block 1217 the computer system may display the calibration value(s) and/or cause an output device to display or emit an alarm to indicate that a calibration value has exceeded a threshold. In some embodiments, block 1217 may proceed as illustrated in FIG. 9 and the corresponding description. From block 1215 or block 1217, the method may return to block 1201 as the computer system receives a new set of profile data from the first geometric sensors for another workpiece (e.g., a log), and the process may be repeated.

While the method of FIG. 12 is described in the context of primary processing line 1000a, the method may also be performed to virtually calibrate one scanner relative to another scanner along processing lines of other types and configurations.

Turning now to FIG. 13, at block 1301 a computer system (e.g., computer system 1026 or 1014) may receive a set of profile data from a first scanner that includes a plurality of geometric sensors with overlapping fields of view (e.g., geometric sensors 102e). At block 1303 the computer system may apply current correction values to the set of profile data to obtain an adjusted set of profile data. At block 1305 the computer system may send the adjusted set of profile data to another computer system, computer, or machine center, and/or use the adjusted set of profile data in various processing tasks. For example, the computer system 1026 may use the adjusted set of profile data instead of the set of profile data from geometric sensors 1002e to generate the 3D model of the flitch (e.g., by assembling the received profile data or interpolating between the received cross sections to generate and assemble new cross sections). Computer system 1026 may use the 3D model to determine an optimized cut solution and a desired position for the flitch. Computer system 1026 may generate commands to control cutting and positioning equipment (e.g., edger infeed 1022a, edger 1030) to reposition the flitch to the desired position and cut the flitch into one or more boards according to the optimized cut solution.

If there are no current correction values for the geometric sensors, blocks 1303 and 1305 may be omitted and the method may proceed to block 1307.

At block 1307 the computer system may align the profile data from each of the geometric sensors to the overlapping portion(s) of data from the other geometric sensor(s) of the scanner to obtain corresponding offset values. Again, in some embodiments the offset values may be X-Y offsets. In other embodiments, the offset values may include X-Y offsets and rotational offsets. At block 1309 the computer system may store the offset values in corresponding buffers.

At block 1311 the computer system may determine an offset value for each of the geometric sensors based on one or more of the offset values stored in the corresponding buffer. For example, the offset value may be the average of a desired number (e.g., 50) offset values in the corresponding buffer. Optionally, at block 1311 the computer system may display the correction values and/or cause an output device to display or emit an alarm to indicate that a correction value has exceeded a threshold. In some embodiments, block 1311 may proceed as illustrated in FIG. 9 and the corresponding description. From block 1309 or block 11311, the method may return to block 1301 as the computer system receives a new set of profile data from the geometric sensor for another workpiece (e.g., a flitch), and the process may be repeated.

While the method of FIG. 13 is described in the context of secondary processing line 1000b, the method may also be performed to virtually calibrate one geometric sensor of a scanner relative to another geometric sensor of the same scanner along processing lines of other types and configurations.

Figure 14:
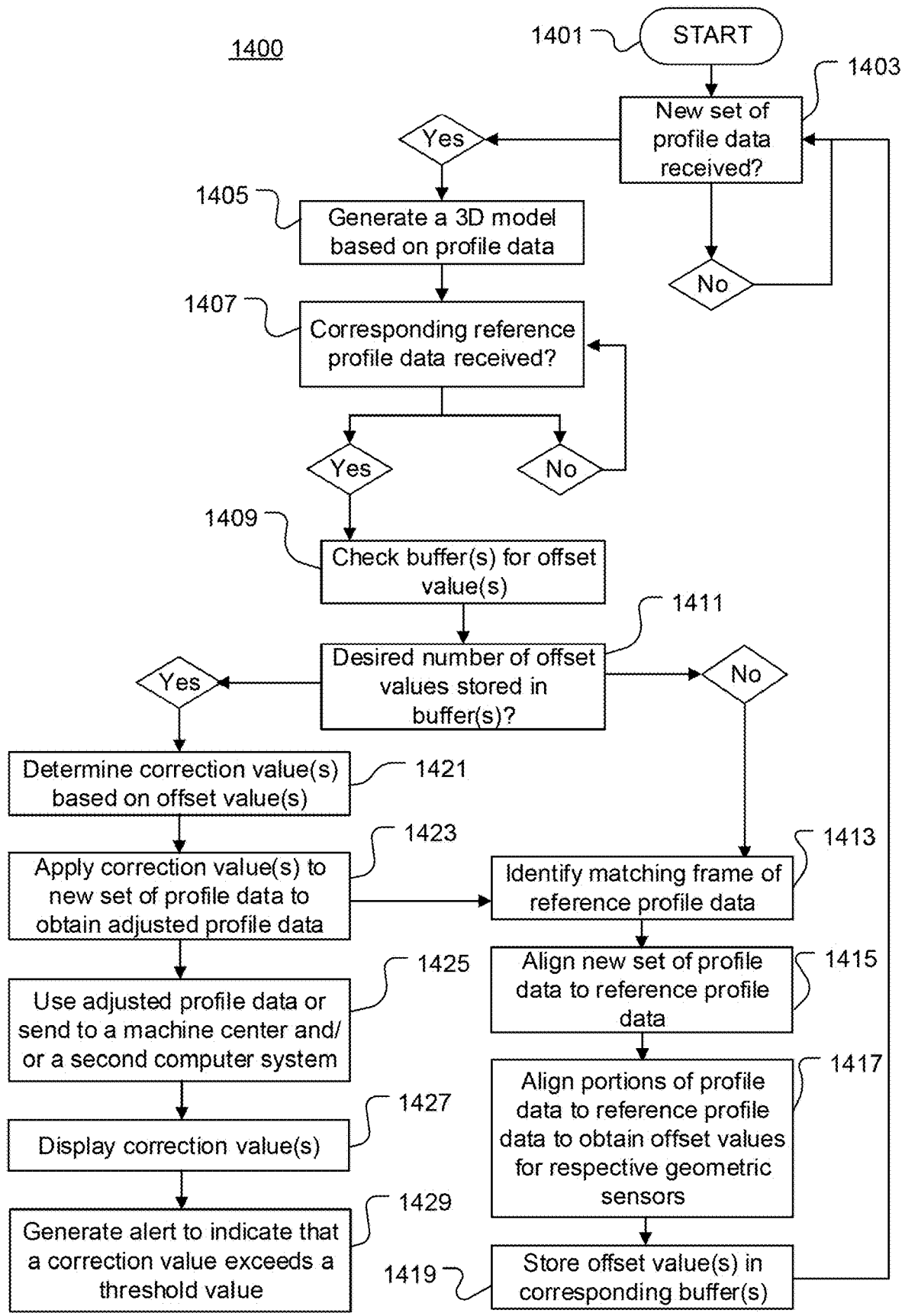
FIG. 14 is a flow diagram of a virtual calibration process.

FIG. 14 illustrates an example of a process flow 1400 for performing a virtual calibration method, in accordance with various embodiments. Upon initiation at block 1401, the process may proceed to block 1403. At block 1403, the computer system may determine whether a new set of profile data has been received. The new set of profile data may be profile data obtained by a first geometric sensor or scanner. If the computer system determines that a new set of profile data has not been received, the computer system may check periodically for a new set of profile data. If the computer system determines that a new set of profile data has been received, the computer system may optionally generate a 3D model based on the received set of profile data. Alternatively, block 1405 may be omitted and the process may proceed from block 1403 to block 1407. At block 1407 the computer system may determine whether a reference set of profile data has been received. The reference set of profile data may be profile data obtained by a second geometric sensor or scanner for the same object (e.g., a piece of wood). Again, the computer system may check periodically for reference profile data until the computer system determines that reference data has been received. In some embodiments the computer system may determine at block 1407 that the received set of profile data matches a corresponding reference set of profile data. Alternatively, the computer system may determine matches later in the process (e.g., at block 1413, or between blocks 1407 and 1413).

At block 1409 the computer system may check one or more buffers for offset values. A buffer may store offset values for a particular first geometric sensor (e.g., geometric sensor 102b), and each offset value in the buffer may represent the X-Y offset (and optionally, a rotational difference) of prior profile data from the first geometric sensor(s) relative to reference profile data from another geometric sensor (e.g., geometric sensor 102a). If the first scanner includes multiple first geometric sensors, the computer system may check the corresponding buffers for offset values. At block 1411 the computer system may determine whether the buffer(s) have at least a desired number of offset values (e.g., 1, 10, 20, 50 offset values per buffer).

If the computer system determines that there are no offset values in the buffer(s), or that there are fewer than the desired number of offset values in the buffer(s), the process may proceed to block 1413. Alternatively, if the computer system determines at block 1407 that the profile data matches the set of reference profile data, the process may proceed from block 1407 to block 1413. In other embodiments the process may proceed to block 1413 from any of blocks 1403, 1405, 1407, 1409, 1411, 1421, or 1423.

At block 1413 the computer system may identify a frame of the reference set of profile data that matches a frame of the new set of profile data. At block 1415 the computer system may align the new set of profile data to the reference set of profile data, or align the two frames. Optionally, if the new set of profile data and the reference set of profile data include data from multiple geometric sensors, at block 1417 the computer system may align each portion of the new set of profile data to the reference profile data to obtain offset values for the corresponding first geometric sensors. Alternatively, block 1417 may be omitted, and the computer system may obtain the offset value(s) at block 1415 by aligning the two sets or frames of profile data. Regardless, at block 1419 the computer system may store the offset value(s) in the buffer(s), and the process may then return to block 1403.

If the computer system determines at block 1411 that the buffer(s) contain at least the desired number of offset values, the process may proceed to block 1421. At block 1421 the computer system may determine one or more correction values based on the offset value(s) in the buffer(s). In some embodiments a correction value may be the most recent offset value in the corresponding buffer. In other embodiments a correction value may be the average of the desired number of most recent offset values stored in the corresponding buffer. Alternatively, a correction value may be determined based on the offset values in any other suitable manner. At block 1423 the computer system may apply the correction value(s) to the new set of profile data to obtain an adjusted set of profile data.

Optionally, the computer system may send the adjusted set of profile data to a machine center and/or another computer system (block 1425), display the correction value(s) (block 1427), and/or generate an alert to indicate that a correction value exceeds a threshold value (block 1429). Regardless, the process may proceed from any of blocks 1423-1429 to block 1413, and the process may continue at block 1413 and thereafter as described above.

In other embodiments, a virtual calibration system may be implemented along processing lines of any type and configuration in facilities such as sawmills, planer mills, plywood mills, or the like. Again, if the facility has existing geometric sensors (e.g., geometric scanners 102) with overlapping fields of view and an existing computer system, a virtual calibration system may be implemented by programming the existing computer system to perform one or more of the virtual calibration methods disclosed herein. Alternatively, a virtual calibration system may be implemented by installing any components of the virtual calibration system that the facility lacks (e.g., one or more of the geometric sensors and/or the programmed computer system).

Figure 15:
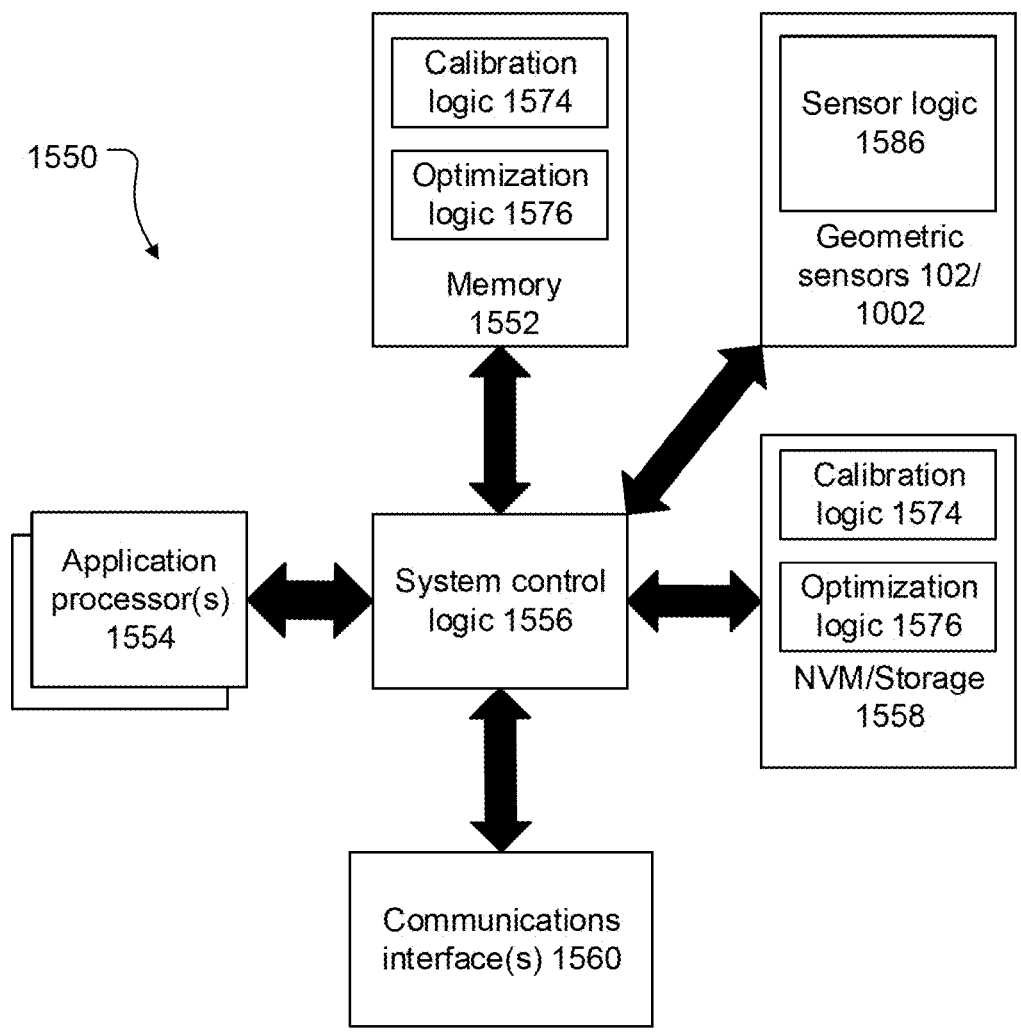
FIG. 15 is a schematic diagram of a computer system suitable for performing virtual calibration methods, all in accordance with various embodiments.

FIG. 15 illustrates an example of a computer system 1550 suitable for performing a virtual calibration method, and optionally other processes described herein, all in accordance with various embodiments. Computer system 1550 may have some or all of the functionality and features of any or all of the computers and computer systems described herein (e.g., computer system(s) 106, 1006, 1026, 1014, computer(s) 1006a, 1006b, 1006c, 1006d).

As illustrated, computer system 1550 may include system control logic 1556 coupled to at least one of the processor(s) 1554, memory 1552 coupled to system control logic 1556, non-volatile memory (NVM)/storage 1558 coupled to system control logic 1556, and one or more communications interface(s) 1560 coupled to system control logic 1556. In various embodiments, system control logic 1556 may be operatively coupled with geometric sensors (e.g., geometric sensors 102, 102*a/b*, 1002*a/b/c/d/e*) with sensor logic 1586. Optionally, system control logic 1556 may also be operatively coupled with one or more other sensors (e.g., sensors 132), output devices (e.g., output device 128), and/or controllers (e.g., controller 120*a*/120*b*/120*c*). In various embodiments the processor(s) 1554 may be a processor core.

System control logic 1556 may include any suitable interface controller(s) to provide for any suitable interface to at least one of the processor(s) 1554 and/or any suitable device or component in communication with system control logic 1556. System control logic 1556 may also interoperate with the sensors and/or the output device(s). In various embodiments, the output device may include a display.

System control logic 1556 may include one or more memory controller(s) to provide an interface to memory 1552. Memory 1552 may be used to load and store data and/or instructions, for example, for various operations of lumber processing system 1000*a*/1000*b*. In one embodiment, system memory 1552 may include any suitable volatile memory, such as suitable dynamic random-access memory ("DRAM").

System control logic 1556, in one embodiment, may include one or more input/output ("I/O") controller(s) to provide an interface to NVM/storage 1558 and communications interface(s) 1560.

NVM/storage 1558 may be used to store data and/or instructions, for example. NVM/storage 1558 may include any suitable non-volatile memory, such as flash memory, for example, and/or any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 1558 may include a storage resource that may physically be a part of a device on which computer system 1550 is installed, or it may be accessible by, but not necessarily a part of, the device. For example, the NVM/storage 1558 may be accessed over a network via the communications interface(s) 1560.

System memory 1552, NVM/storage 1558, and/or system control logic 1556 may include, in particular, temporal and persistent copies of calibration logic 1574. The calibration logic 1574 may include instructions operable, upon execution by at least one of the processor(s) 1554, to cause computer system 1550 to perform one or more of the virtual calibration methods described herein (e.g., method 600, 700, 800, 900, 1200, 1300, 1400), or various operations thereof. Optionally, system memory 1552, NVM/storage 1558, and/or system control logic 1556 may further include temporal and persistent copies of optimization logic 1576. The optimization logic 1576 may include instructions operable, upon execution by at least one of the processor(s) 1554, to cause computer system 1550 to perform various other operations, such as generating 3D models based on received/adjusted profile data, matching sets of profile data or 3D models, determining a desired position for a workpiece upstream of a cutting device, determining a cut solution for the workpiece, generating commands to a controller, machine center, or workpiece handling device to position or cut the workpiece, and the like.

Communications interface(s) 1560 may provide an interface for computer system 1550 to communicate over one or more network(s) and/or with any other suitable device. Communications interface(s) 1560 may include any suitable hardware and/or firmware, such as a network adapter, one or more antennas, a wireless interface, and so forth. In various embodiments, communication interface(s) 1560 may include an interface for computer system 1550 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 1554, memory 1552, and so forth may vary. In various embodiments, computer system 1550 may include, but is not limited to, a smart phone, a computing tablet, a laptop computer, a desktop computer, and/or a server. In various embodiments computer system 1550 may be, but is not limited to, one or more servers known in the art.

In one embodiment, at least one of the processor(s) 1554 may be packaged together with system control logic 1556, calibration logic 1574, and/or optimization logic 1576. For example, at least one of the processor(s) 1554 may be packaged together with system control logic 1556, calibration logic 1574, and/or optimization logic 1576 to form a System in Package ("SiP"). In another embodiment, at least one of the processor(s) 1554 may be integrated on the same die with system control logic 1556, calibration logic 1574, and/or optimization logic 1576. For example, at least one of the processor(s) 1554 may be integrated on the same die with system control logic 1556, calibration logic 1574, and/or optimization logic 1576 to form a System on Chip ("SoC").

The computer system 1550 may be configured to perform any or all of the calculations, operations, and/or functions described herein, including the methods and operations described with reference to FIGS. 6-9, 12-14, and any of the other Figures.

Therefore, in some embodiments, a virtual calibration system may be implemented along an existing workpiece processing line. If the workpiece processing line has two or more geometric sensors with overlapping fields of view and a computer system operatively coupled with the geometric sensors, the virtual calibration system may be implemented by programming the existing computer system to perform one or more of the virtual calibration methods disclosed herein, or by operatively coupling another computer system programmed to perform such method(s) with the existing geometric sensors. Similarly, if the workpiece processing line lacks at least two geometric sensors with overlapping fields of view, a virtual calibration system may be implemented by providing the geometric sensors in a suitable arrangement and operatively coupling the geometric sensors with a computer system programmed to perform the method(s).

Another aspect of the present disclosure is a virtual calibration system that comprises a first and a second geometric sensor and a computer system operatively coupled with the first and second geometric sensors, the computer system programmed with instructions operable, upon execution by a processor of the computer system, to perform one or more of the virtual calibration methods described and/or claimed herein.

Another aspect of the present disclosure is a computer-readable storage medium programmed with instructions operable, upon execution by a processor, to perform one or more of the virtual calibration methods described and/or claimed herein.

Another aspect of the present disclosure is a computer program product comprising non-transitory computer-readable instructions operable, upon execution by a processor, to cause the processor to perform one or more of the virtual calibration methods described and/or claimed herein.

Another aspect of the present disclosure is a method of upgrading a workpiece processing line, wherein the workpiece processing line includes at least two geometric sensors with overlapping fields of view arranged to scan workpieces moving along a flow path, the method comprising operatively coupling the geometric sensors with a computer system programmed to perform one or more of the virtual calibration methods described and/or claimed herein.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of automatically offsetting geometric sensor misalignment in a scanning system configured to scan workpieces along a workpiece processing line, the method comprising:
   receiving a first set of profile data obtained by one or more first geometric sensors of the scanning system, and a reference set of profile data obtained by one or more second geometric sensors of the scanning system, for a first workpiece, wherein the first set of profile data includes profile data for a first portion of the first workpiece and the reference set of profile data includes profile data for said first portion of the first workpiece, such that the sets of profile data include overlapping profile data;
   determining a first one or more offset values that represents a translational difference of the first set of profile data, or portions thereof, relative to the reference set of profile data;
   receiving a second set of profile data obtained by the one or more first geometric sensors for a second workpiece;
   generating an adjusted set of profile data for the second workpiece based at least on the second set of profile data and the first one or more offset values to thereby offset a positional error of the one or more first geometric sensors relative to the one or more reference geometric sensors; and
   automatically sending one or more control signals to a cutting or positioning device of the workpiece processing line to cut or reposition the second workpiece based at least in part on the adjusted set of profile data.

2. The method of claim 1, wherein the one or more first geometric sensors is a single first geometric sensor, and the first one or more offset values is a first offset value, and
   wherein determining the first one or more offset values includes
      aligning the first set of profile data to the reference set of profile data based at least in part on the overlapping profile data,
      determining an offset of the first set of profile data relative to the reference set of profile data based on the alignment, wherein the offset includes an X-Y offset and/or a rotational offset, and
      storing the determined offset in a first buffer as the first offset value.

3. The method of claim 2, wherein generating the adjusted set of profile data includes determining a correction value based at least on the first offset value, and applying the one or more correction values to the second set of profile data to thereby generate the adjusted set of profile data.

4. The method of claim 3, wherein determining the correction value includes determining an average of a plurality of offset values stored in the first buffer, and the plurality of offset values includes the first offset value.

5. The method of claim 4, wherein the plurality of offset values is a predetermined number of the most recent offset values stored in the first buffer, and the correction value is the determined average of said plurality of offset values.

6. The method of claim 3, wherein the single first geometric sensor is positioned to scan the workpieces in a first scan zone, and the one or more second geometric sensors is positioned to scan the workpieces in a second scan zone that is spaced apart from the first scan zone along a flow path.

7. The method of claim 3, wherein the single first geometric sensor and the one or more second geometric sensors are positioned to scan the workpieces in a first scan zone.

8. The method of claim 3, further including generating an alert based at least in part on the first offset value.

9. The method of claim 8, wherein generating the alert includes
   comparing the correction value to a threshold value,
   determining, based on the comparison, whether the correction value exceeds the threshold value, and
   in response to determining that the correction value exceeds the threshold value, sending a command to an output device to generate an alert message to thereby alert an operator of a misalignment of the first geometric sensor relative to the second geometric sensor.

10. The method of claim 1, wherein the one or more first geometric sensors is a plurality of first geometric sensors positioned to scan the workpieces in a first scan zone, each of said portions of the first set of profile data is a portion of profile data obtained by a corresponding one of the first geometric sensors, and the first one or more offset values is a plurality of first offset values,
   wherein determining the one or more first offset values includes
      aligning the first set of profile data to the reference set of profile data,
      aligning the portions of profile data to the reference set of profile data,
      determining an offset of each said portion of profile data relative to the reference set of profile data based on the alignment, wherein each of the offsets includes an X-Y offset and/or a rotational offset, and
      storing the determined offsets in a corresponding plurality of buffers as the offset values, such that each of the buffers includes the first offset value for a corresponding one of the first geometric sensors.

11. The method of claim 10, wherein generating the adjusted set of profile data includes
   determining a plurality of correction values based at least on the first offset values, and
   applying the correction values to the second set of profile data to thereby generate the adjusted set of profile data.

12. The method of claim 11, wherein determining the correction values includes determining an average of at least some of the offset values stored in each of the buffers, and wherein the determined averages are the correction values for the respective first geometric sensors.

13. The method of claim 12, wherein determining the correction values includes determining an average of a desired number of the most recent offset values stored in each of the buffers.

14. The method of claim 11, wherein the one or more second geometric sensors is positioned to scan the workpieces in a second scan zone that is spaced apart from the first scan zone along a flow path.

15. The method of claim 11, wherein the one or more second geometric sensors is positioned to scan the workpieces in the first scan zone.

16. The method of claim 11, further including generating an alert based at least in part on one of the first offset values.

17. The method of claim 16, wherein generating the alert includes
comparing the correction values to a threshold value,
determining, based on the comparison, whether the correction value exceeds the threshold value, and
in response to determining that the correction value exceeds the threshold value, sending a command to an output device to generate an alert message to thereby alert an operator of a misalignment of a corresponding one of the first geometric sensors relative to the one or more second geometric sensors.

18. The method of claim 1, wherein the workpieces are pieces of wood.

19. The method of claim 1, wherein the workpieces are logs, the one or more first geometric sensors is a plurality of geometric sensors positioned to scan the logs in a first scan zone located near a log turner, and the one or more second geometric sensors is a plurality of geometric sensors positioned to scan the logs in a second scan zone located upstream of the first scan zone, the method further including:
comparing the adjusted set of scan data to the reference set of scan data to determine a current position of the second workpiece,
wherein the cutting or positioning device is the log turner, and the one or more control signals are configured to cause the log turner to reposition the second workpiece based at least on a difference between the current position and a desired position.

20. The method of claim 1, wherein the workpieces are flitches, and the first and second geometric sensors are positioned to scan the flitches upstream of an edger, the method further including:
determining a cut solution for the flitch based at least on the adjusted set of profile data,
wherein the cutting or positioning device is the edger, and the one or more control signals are configured to cause the edger to cut the second workpiece according to the cut solution.

* * * * *